US012736726B2

(12) United States Patent
Shiono et al.

(10) Patent No.: US 12,736,726 B2
(45) Date of Patent: Sep. 15, 2026

(54) OPTICAL FILTER

(71) Applicant: AGC Inc., Tokyo (JP)

(72) Inventors: Kazuhiko Shiono, Fukushima (JP); Takashi Nagata, Shizuoka (JP)

(73) Assignee: AGC Inc., Tokyo (JP)

(*) Notice: Subject to any disclaimer, the term of this patent is extended or adjusted under 35 U.S.C. 154(b) by 123 days.

(21) Appl. No.: 18/927,235

(22) Filed: Oct. 25, 2024

(65) Prior Publication Data

US 2025/0052934 A1 Feb. 13, 2025

Related U.S. Application Data

(63) Continuation of application No. 18/396,795, filed on Dec. 27, 2023, now Pat. No. 12,181,697, which is a continuation of application No. PCT/JP2022/026327, filed on Jun. 30, 2022.

(30) Foreign Application Priority Data

Jul. 7, 2021 (JP) ................................ 2021-113057

(51) Int. Cl.
*G02B 5/22* (2006.01)
*G02B 5/20* (2006.01)

(52) U.S. Cl.
CPC .................................... *G02B 5/208* (2013.01)

(58) Field of Classification Search
CPC . G02B 5/208; G02B 5/22; G02B 5/28; G02B 5/281; G02B 5/20
See application file for complete search history.

(56) References Cited

U.S. PATENT DOCUMENTS

2014/0063597 A1 3/2014 Shimmo
2014/0091419 A1 4/2014 Hasegawa
2015/0085354 A1 3/2015 Tatemura
2015/0146057 A1 5/2015 Konishi
2017/0017023 A1 1/2017 Sugiyama
2017/0343710 A1 11/2017 Shiono
2018/0346729 A1 12/2018 Miyake
2020/0354577 A1 11/2020 Suzuki et al.
(Continued)

FOREIGN PATENT DOCUMENTS

JP 2021-081520 A 5/2021
WO WO 2011/132786 A1 10/2011
WO WO 2018/043564 A1 3/2018
(Continued)

OTHER PUBLICATIONS

Examiner provided machine translation of Tatemura, WO 2019/189039 A1 (Year: 2019).*
(Continued)

*Primary Examiner* — Balram T Parbadia
(74) *Attorney, Agent, or Firm* — Oblon, McClelland, Maier & Neustadt, L.L.P.

(57) ABSTRACT

An optical filter, includes: a substrate, a dielectric multilayer film 1 laid on or above one major surface of the substrate, and a dielectric multilayer film 2 laid on or above the other major surface of the substrate, in which the substrate includes a near infrared ray absorbing glass and a resin film, the resin film includes a resin and a pigment (NIR1), and the optical filter satisfies all of spectral characteristics (i-1) to (i-3), (i-6) to (i-8), and (i-10) to (i-13).

16 Claims, 6 Drawing Sheets

(56) References Cited

U.S. PATENT DOCUMENTS

| | | | |
|---|---|---|---|
| 2020/0379150 | A1 | 12/2020 | Takagi et al. |
| 2020/0386928 | A1 | 12/2020 | Takagi et al. |

FOREIGN PATENT DOCUMENTS

| | | | |
|---|---|---|---|
| WO | WO 2019/111638 | A1 | 6/2019 |
| WO | WO 2019/111965 | A1 | 6/2019 |
| WO | WO 2019/151348 | A1 | 8/2019 |
| WO | WO 2019/189039 | A1 | 10/2019 |

OTHER PUBLICATIONS

International Search Report issued Sep. 20, 2022 in PCT/JP2022/026327 filed on Jun. 30, 2022, citing document 17 therein, 2 pages.

* cited by examiner

OPTICAL FILTER

CROSS-REFERENCE TO RELATED APPLICATIONS

This application is a continuation Application of U.S. application Ser. No. 18/396,795, filed Dec. 27, 2023, which is a bypass continuation of International Patent Application No. PCT/JP2022/026327, filed on Jun. 30, 2022, which claims priority to Japanese Patent Application No. 2021-113057, filed on Jul. 7, 2021. The contents of these applications are hereby incorporated by reference in their entireties.

TECHNICAL FIELD

The present invention relates to an optical filter that transmits visible light and shields near infrared light.

BACKGROUND ART

In an imaging device including a solid state image sensor, in order to satisfactorily reproduce a color tone and obtain a clear image, an optical filter that transmits light in a visible region (hereinafter, also referred to as "visible light") and shields light in a near infrared wavelength region (hereinafter, also referred to as "near infrared light") is used.

Examples of such an optical filter include various types such as a reflection type filter in which dielectric thin films having different refractive indices are alternately laid (dielectric multilayer film) on one surface or both surfaces of a transparent substrate, and light desired to be shielded is reflected using interference of light.

Patent Literatures 1 and 2 disclose an optical filter including a dielectric multilayer film and an absorption layer containing a pigment.

Patent Literature 1: WO2019/151348

Patent Literature 2: WO2018/043564

SUMMARY OF INVENTION

In an optical filter including a dielectric multilayer film, since an optical film thickness of the dielectric multilayer film changes depending on an incident angle of light, there is a problem that a spectral transmittance curve changes depending on the incident angle. For example, according to the number of stacked layers of the multilayer film, a large change in transmittance in a visible light region due to interference caused by reflected light at interfaces of respective layers, that is, a ripple is generated, and the larger the incident angle of light is, the stronger the generation of the ripple is. When such a filter is used, spectral sensitivity of the solid state image sensor may be affected by the incident angle. In particular, with a reduction in height of camera modules in recent years, use under a condition of a high incident angle is assumed, and therefore an optical filter that is hardly affected by an incident angle is required.

An object of the present invention is to provide an optical filter which has a small change in transmittance in a visible light region even at a high incident angle and is excellent in transmittance in the visible light region and shielding property in a near infrared light region.

The present invention provides an optical filter and the like having the following configuration.

[1] An optical filter including:

a substrate, and a dielectric multilayer film laid on or above at least one major surface of the substrate as an outermost layer, in which the substrate includes a near infrared ray absorbing glass and a resin film, the resin film is laid on or above at least one major surface of the near infrared ray absorbing glass and has a thickness of 10 μm or less, the resin film includes a resin and a pigment (NIR1) having a maximum absorption wavelength in 680 nm to 740 nm in the resin, and the optical filter satisfies all of the following spectral characteristics (i-1) to (i-13):

(i-1) in a spectral transmittance curve at an incident angle of 0) degrees, an average transmittance $T_{450\text{-}600(0deg)AVE}$ at a wavelength of 450 nm to 600 nm is 80% or more, (i-2) in a spectral transmittance curve at an incident angle of 50 degrees, an average transmittance $T_{450\text{-}600(50deg)AVE}$ at the wavelength of 450 nm to 600 nm is 80% or more, (i-3) an absolute value of a difference between the average transmittance $T_{450\text{-}600(0deg)AVE}$ and the average transmittance $T_{450\text{-}600(50deg)AVE}$ is 5% or less, (i-4) in the spectral transmittance curve at an incident angle of 0 degrees, a transmittance $T_{450(0deg)}$ at a wavelength of 450 nm is 80% or more, (i-5) in the spectral transmittance curve at an incident angle of 50 degrees, a transmittance $T_{450(50deg)}$ at the wavelength of 450 nm is 80% or more, (i-6) in the spectral transmittance curve at an incident angle of 0 degrees, a maximum transmittance $T_{450\text{-}600(0deg)MAX}$ at the wavelength of 450 nm to 600 nm is 90% or more, (i-7) in the spectral transmittance curve at an incident angle of 0 degrees, a wavelength $IR50_{(0deg)}$ at which a transmittance is 50% is in a range of 610 nm to 650 nm, (i-8) in the spectral transmittance curve at an incident angle of 50 degrees, a wavelength $IR50_{(50deg)}$ at which a transmittance is 50% is in the range of 610 nm to 650 nm, (i-9) an absolute value of a difference between the wavelength $IR50_{(0deg)}$ and the wavelength $IR50_{(50deg)}$ is 10 nm or less, (i-10) in the spectral transmittance curve at an incident angle of 0 degrees, a maximum transmittance $T_{1000\text{-}1200(0deg)MAX}$ at a wavelength of 1,000 nm to 1,200 nm is 5% or less, (i-11) in the spectral transmittance curve at an incident angle of 50 degrees, a maximum transmittance $T_{1000\text{-}1200(50deg)MAX}$ at the wavelength of 1,000 nm to 1,200 nm is 5% or less, (i-12) the transmittance $T_{450(0deg)}$/the maximum transmittance $T_{1000\text{-}1200(0deg)MAX} \geq 25$, and (i-13) the transmittance $T_{450(50deg)}$/the maximum transmittance $T_{1000\text{-}1200(50deg)MAX} \geq 10$.

According to the present invention, it is possible to provide an optical filter which has a small change in transmittance in a visible light region even at a high incident angle and is excellent in transmittance in the visible light region and shielding property in the near infrared light region.

DESCRIPTION OF EMBODIMENTS

Figure 1:
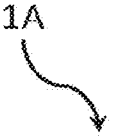
FIG. 1 is a cross-sectional view schematically illustrating an example of an optical filter according to one embodiment.
Figure 1:
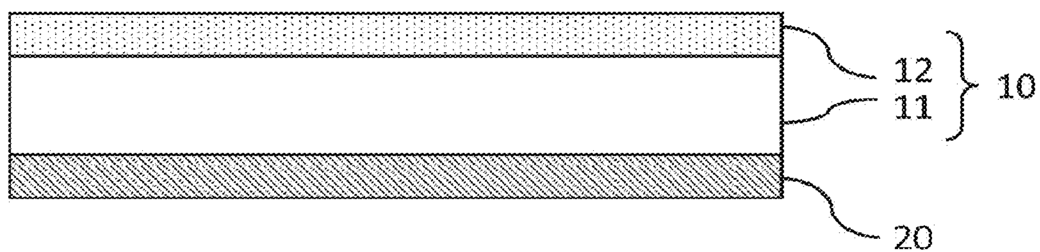

Hereinafter, embodiments of the present invention will be described.

In the present description, a near infrared ray absorbing pigment may be abbreviated as a "NIR pigment", and an ultraviolet absorbing pigment may be abbreviated as a "UV pigment".

In the present description, a compound represented by a formula (I) is referred to as a compound (I). The same applies to compounds represented by other formulae. A pigment composed of the compound (I) is also referred to as a pigment (I), and the same applies to other pigments. In addition, a group represented by the formula (I) is also referred to as a group (I), and the same applies to groups represented by other formulae.

In the present description, internal transmittance is transmittance obtained by subtracting an influence of interface reflection from measured transmittance, which is represented by a formula {measured transmittance/(100−reflectance)}×100.

In the present description, transmittance of a substrate and a spectrum of transmittance of a resin film including a case where a pigment is contained in a resin are all "internal transmittance" even when described as "transmittance". On the other hand, transmittance measured by dissolving a pigment in a solvent such as dichloromethane, transmittance of a dielectric multilayer film, and transmittance of an optical filter including the dielectric multilayer film are measured transmittance.

In the present description, transmittance of, for example, 90% or more in a specific wavelength region means that the transmittance does not fall below 90% in the entire wavelength region, that is, a minimum transmittance is 90% or more in the wavelength region. Similarly, transmittance of, for example, 1% or less in the specific wavelength region means that the transmittance does not exceed 1% in the entire wavelength region, that is, a maximum transmittance is 1% or less in the wavelength region. The same applies to the internal transmittance. An average transmittance and an average internal transmittance in the specific wavelength region are the arithmetic mean of a transmittance and an internal transmittance per 1 nm in the wavelength region.

Optical characteristics can be measured by using an ultraviolet-visible spectrophotometer.

In the present description, the symbol "–" or the word "to" that is used to express a numerical range includes the numerical values before and after the symbol or the word as the upper limit and the lower limit of the range, respectively.

<Optical Filter>

An optical filter (hereinafter, also referred to as "the filter") according to one embodiment of the present invention includes a substrate and a dielectric multilayer film laid on or above at least one major surface of the substrate as an outermost layer.

Here, the substrate includes a near infrared ray absorbing glass and a resin film having a thickness of 10 μm or less and laid on or above at least one major surface of the near infrared ray absorbing glass. Further, the resin film includes a resin and a pigment (NIR1) having a maximum absorption wavelength in 680 nm to 740 nm in the resin.

Reflection characteristics of the dielectric multilayer film and absorption characteristics of the substrate including the near infrared ray absorbing glass and the near infrared ray absorbing pigment allow the optical filter as a whole to achieve excellent transmittance in a visible light region and excellent shielding property in a near infrared light region.

Figure 2:
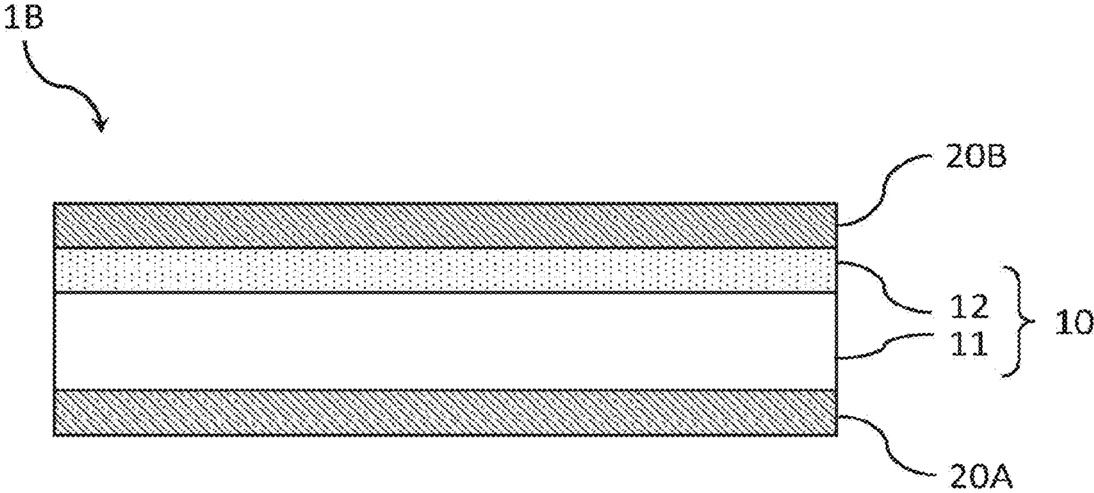
FIG. 2 is a cross-sectional view schematically illustrating another example of the optical filter according to one embodiment.
Figure 3:
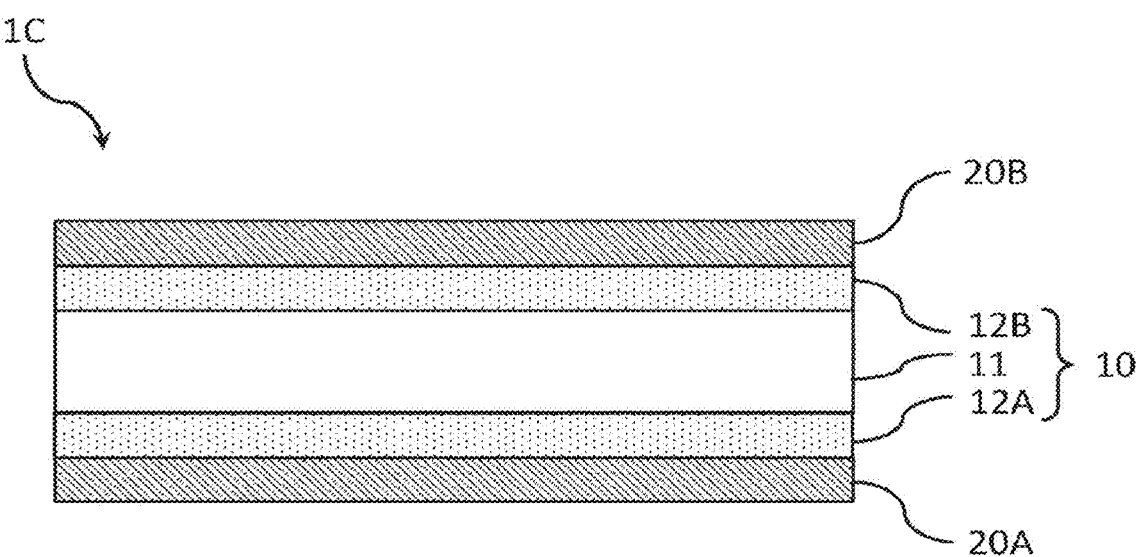
FIG. 3 is a cross-sectional view schematically illustrating another example of the optical filter according to one embodiment.

A configuration example of the filter will be described with reference to the drawings. FIGS. 1 to 3 are cross-sectional views schematically illustrating examples of the optical filter according to one embodiment.

An optical filter 1A illustrated in FIG. 1 is an example in which a dielectric multilayer film 20 is provided on one major surface of a substrate 10 including a near infrared ray absorbing glass 11 and a resin film 12. Note that "including a specific layer on or above a major surface of a substrate" is not limited to a case where the layer is provided in contact with a major surface of the substrate, and includes a case where another functional layer is provided between the substrate and the layer. In the optical filter 1A of FIG. 1, the dielectric multilayer film 20 is provided on a surface of the near infrared ray absorbing glass 11, but may be provided on a surface of the resin film 12.

An optical filter 1B illustrated in FIG. 2 is an example in which dielectric multilayer films 20A and 20B are provided on both major surfaces of the substrate 10.

An optical filter 1C illustrated in FIG. 3 is an example in which the substrate 10 includes resin films 12A and 12B on both major surfaces of the near infrared ray absorbing glass 11, and dielectric multilayer films 20A and 20B on both major surfaces of the substrate 10.

The optical filter according to the present invention satisfies all of the following spectral characteristics (i-1) to (i-13):

(i-1) in a spectral transmittance curve at an incident angle of 0 degrees, an average transmittance $T_{450\text{-}600(0deg)AVE}$ at a wavelength of 450 nm to 600 nm is 80% or more, (i-2) in a spectral transmittance curve at an incident angle of 50 degrees, an average transmittance $T_{450\text{-}600(50deg)AVE}$ at the wavelength of 450 nm to 600 nm is 80% or more, (i-3) an absolute value of a difference between the average transmittance $T_{450\text{-}600(deg)AVE}$ and the average transmittance $T_{450\text{-}600(50deg)AVE}$ is 5% or less, (i-4) in the spectral transmittance curve at an incident angle of 0 degrees, a transmittance $T_{450(0deg)}$ at a wavelength of 450 nm is 80% or more, (i-5) in the spectral transmittance curve at an incident angle of 50 degrees, a transmittance $T_{450(50deg)}$ at the wavelength of 450 nm is 80% or more, (i-6) in the spectral transmittance curve at an incident angle of 0 degrees, a maximum transmittance $T_{450\text{-}600(0deg)MAX}$ at the wavelength of 450 nm to 600 nm is 90% or more, (i-7) in the spectral transmittance curve at an incident angle of 0 degrees, a wavelength $IR50_{(0deg)}$ at which a transmittance is 50% is in a range of 610 nm to 650 nm, (i-8) in the spectral transmittance curve at an incident angle of 50 degrees, a wavelength $IR50_{(50deg)}$ at which a transmittance is 50% is in the range of 610 nm to 650 nm, (i-9) an absolute value of a difference between the wavelength $IR50_{(0deg)}$ and the wavelength $IR50_{(50deg)}$ is 10 nm or less.

(i-10) in the spectral transmittance curve at an incident angle of 0 degrees, a maximum transmittance $T_{1000\text{-}1200(0deg)MAX}$ at a wavelength of 1,000 nm to 1,200 nm is 5% or less, (i-11) in the spectral transmittance curve at an incident angle of 50 degrees, a maximum transmittance $T_{1000\text{-}1200(50deg)MAX}$ at the wavelength of 1,000 nm to 1,200 nm is 5% or less, (i-12) the transmittance $T_{450(0deg)}$/the maximum transmittance $T_{1000\text{-}1200(0deg)MAX} \geq 25$, and (i-13) the transmittance $T_{450(50deg)}$/the maximum transmittance $T_{1000\text{-}1200(50deg)MAX} \geq 10$.

The filter satisfying all of the spectral characteristics (i-1) to (i-13) is an optical filter having a small change in transmittance in the visible light region even at a high incident angle of 50 degrees and excellent shielding property in the near infrared light region.

It means that by satisfying the spectral characteristics (i-1) and (i-2), the transmittance in the visible light region of 450 nm to 600 nm is excellent even at a high incident angle, and by satisfying the spectral characteristic (i-3), a change in transmittance (ripple) in the visible light region of 450 nm to 600 nm is small even at a high incident angle.

$T_{450\text{-}600(0deg)AVE}$ is preferably 85% or more, and more preferably 87% or more.

$T_{450\text{-}600(50deg)AVE}$ is preferably 83% or more, and more preferably 85% or more.

The difference between $T_{450\text{-}600(0deg)AVE}$ and $T_{450\text{-}600(50deg)AVE}$ is preferably 4.5% or less, and more preferably 4% or less.

It means that by satisfying the spectral characteristics (i-4) and (i-5), transmittance in a blue light region is excellent.

$T_{450(0deg)}$ is preferably 82% or more, and more preferably 85% or more.

$T_{450(50deg)}$ is preferably 81% or more, and more preferably 82% or more.

It means that by satisfying the spectral characteristic (i-6), the transmittance in the visible light region of 450 nm to 600 nm is excellent even at a high incident angle.

$T_{450\text{-}600(0deg)MAX}$ is preferably 92% or more, and more preferably 93% or more.

It means that by satisfying the spectral characteristics (i-7) and (i-8), the light in the near infrared region is shielded and visible transmitted light can be efficiently taken in.

$IR50_{(0deg)}$ is preferably 615 nm to 640 nm, and more preferably 615 nm to 635 nm.

$IR50_{(50deg)}$ is preferably 615 nm to 640 nm, and more preferably 615 nm to 635 nm.

It means that by satisfying the spectral characteristic (i-9), a spectral curve in the region of 610 nm to 650 nm is hardly shifted even at a high incident angle.

The absolute value of the spectral characteristic (i-9) is preferably 9 nm or less, and more preferably 8 nm or less.

It means that by satisfying the spectral characteristics (i-10) and (i-11), the light shielding property in an infrared region of 1,000 nm to 1,200 nm is excellent even at a high incident angle.

$T_{1000\text{-}1200(0deg)MAX}$ is preferably 4% or less, and more preferably 2% or less.

$T_{1000\text{-}1200(50deg)MAX}$ is preferably 4% or less, and more preferably 3% or less.

It means that by satisfying the spectral characteristics (i-12) and (i-13), both the transmittance in the visible light region and the light shielding property in the infrared region are achieved even at a high incident angle.

$T_{450(0deg)}/T_{1000\text{-}1200(0deg)MAX}$ is preferably 30 or more, and more preferably 40 or more.

$T_{450(50deg)}/T_{1000\text{-}1200(50deg)MAX}$ is preferably 15 or more, and more preferably 20 or more.

The optical filter according to the present invention preferably further satisfies the following spectral characteristics (i-14) and (i-15):

(i-14) in the spectral transmittance curve at an incident angle of 0 degrees, a maximum transmittance $T_{750\text{-}1000(0deg)MAX}$ at a wavelength of 750 nm to 1.000 nm is 1% or less, and (i-15) in the spectral transmittance curve at an incident angle of 50 degrees, a maximum transmittance $T_{750\text{-}1000(50deg)MAX}$ at the wavelength of 750 nm to 1,000 nm is 1% or less.

It means that by satisfying the spectral characteristics (i-14) and (i-15), the light shielding property in a near infrared region of 750 nm to 1,000 nm is excellent even at a high incident angle.

$T_{750\text{-}1000(0deg)MAX}$ is preferably 4% or less, and more preferably 2% or less.

$T_{750\text{-}1000(50deg)MAX}$ is preferably 4% or less, and more preferably 3% or less.

The optical filter according to the present invention preferably further satisfies the following spectral characteristics (i-16) to (i-18):

(i-16) in the spectral transmittance curve at an incident angle of 0 degrees, a wavelength $UV50_{(0deg)}$ at which a transmittance is 50% is in a range of 400 nm to 440 nm, (i-17) in the spectral transmittance curve at an incident angle of 50 degrees, a wavelength $UV50_{(50deg)}$ at which a transmittance is 50% is in a range of 400 nm to 440 nm, and (i-18) an absolute value of a difference between the wavelength $UV50_{(0deg)}$ and the wavelength $UV50_{(50deg)}$ is 3 nm or less.

It means that by satisfying the spectral characteristics (i-16) and (i-17), the light in a near ultraviolet region is shielded and visible transmitted light can be efficiently taken in.

It means that by satisfying the spectral characteristic (i-18), a spectral curve in the region of 400 nm to 440 nm is hardly shifted even at a high incident angle.

$UV50_{(0deg)}$ is preferably 400 nm to 430 nm, and more preferably 410 nm to 430 nm.

$UV50_{(50deg)}$ is preferably 400 nm to 430 nm, and more preferably 410 nm to 430 nm.

The spectral characteristic (i-18) is preferably 2.5 nm or less, and more preferably 2 nm or less.

The optical filter according to the present invention preferably further satisfies the following spectral characteristics (i-19) to (i-22):

(i-19) in the spectral transmittance curve at an incident angle of 0 degrees, an average transmittance $T_{370\text{-}400(0deg)AVE}$ at a wavelength of 370 nm to 400 nm is 2% or less, (i-20) in the spectral transmittance curve at an incident angle of 50 degrees, an average transmittance $T_{370\text{-}400(50deg)AVE}$ at the wavelength of 370 nm to 400 nm is 2% or less, (i-21) in the spectral transmittance curve at an incident angle of 0 degrees, a maximum transmittance $T_{370\text{-}400(0deg)MAX}$ at the wavelength of 370 nm to 400 nm is 3% or less, and (i-22) in the spectral transmittance curve at an incident angle of 50 degrees, a maximum transmittance $T_{370\text{-}400(50deg)MAX}$ at the wavelength of 370 nm to 400 nm is 3% or less.

It means that by satisfying the spectral characteristics (i-19) to (i-22), the light shielding property in a near ultraviolet region of 370 nm to 400 nm is excellent even at a high incident angle.

$T_{370\text{-}400(0deg)AVE}$ is preferably 1% or less, and more preferably 0.5% or less.

$T_{370\text{-}400(50deg)AVE}$ is preferably 1% or less, and more preferably 0.5% or less.

$T_{370\text{-}400(0deg)MAX}$ is preferably 2.5% or less, and more preferably 2% or less.

$T_{370\text{-}400(50deg)MAX}$ is preferably 2.5% or less, and more preferably 2% or less.

<Dielectric Multilayer Film>

In the filter, the dielectric multilayer film is laid on or above at least one major surface of the substrate as an outermost layer.

In the filter, the dielectric multilayer film preferably satisfies all of the following spectral characteristics (v-1) to (v-5):

(v-1) in a spectral transmittance curve at an incident angle of 0 degrees, a minimum transmittance $T_{450\text{-}600(0deg)MIN}$ at the wavelength of 450 nm to 600 nm is 90% or more, (v-2) in a spectral transmittance curve at an incident angle of 50 degrees, a minimum transmittance $T_{450\text{-}600(50deg)MIN}$ at the wavelength of 450 nm to 600 nm is 90% or more, (v-3) an absolute value of a difference between the minimum transmittance $T_{450\text{-}600(0deg)MIN}$ and the minimum transmittance $T_{450\text{-}600(50deg)MIN}$ is 5% or less, (v-4) in the spectral transmittance curve at an incident angle of 0 degrees, an average transmittance $T_{700\text{-}1200(0deg)AVE}$ at a wavelength of 700 nm to 1,200 nm is 30% to 75%, and (v-5) in the spectral transmittance curve at an incident angle of 50 degrees, an average transmittance $T_{700\text{-}1200(50deg)AVE}$ at the wavelength of 700 nm to 1.200 nm is 30% to 75%.

It means that by satisfying the spectral characteristics (v-4) and (v-5), the light in the near infrared region is gently shielded, and by satisfying the spectral characteristics (v-1) to (v-3), a change in transmittance (ripple) at a high incident angle in the visible light region is small.

$T_{450\text{-}600(0deg)MIN}$ is preferably 92% or more, and more preferably 93% or more.

$T_{450\text{-}600(50deg)MIN}$ is preferably 90% or more, and more preferably 90.5% or more.

(v-3) is preferably 5% or less, and more preferably 4% or less.

$T_{700\text{-}1200(0deg)AVE}$ is preferably 40% to 75%, and more preferably 50% to 75%.

$T_{700\text{-}1200(50deg)AVE}$ is preferably 40% to 75%, and more preferably 50% to 75%.

In the filter, the dielectric multilayer film preferably further satisfies the following spectral characteristics (v-6) to (v-8):

(v-6) in the spectral transmittance curve at an incident angle of 0 degrees, the average transmittance $T_{450\text{-}600(0deg)AVE}$ at the wavelength of 450 nm to 600 nm is 91% or more, (v-7) in the spectral transmittance curve at an incident angle of 50 degrees, the average transmittance $T_{450\text{-}600(50deg)AVE}$ at the wavelength of 450 nm to 600 nm is 91% or more, and (v-8) the absolute value of the difference between the average transmittance $T_{450\text{-}600(0deg)AVE}$ and the average transmittance $T_{450\text{-}600(50deg)AVE}$ is 5% or less.

It means that by satisfying the spectral characteristics (v-6) to (v-8), transmittance of visible light is excellent even at a high incident angle, and a change in transmittance (ripple) accompanying variation in incident angle is small.

$T_{450\text{-}600(0deg)AVE}$ is preferably 90% or more, and more preferably 92% or more.

$T_{450\text{-}600(50deg)AVE}$ is preferably 90% or more, and more preferably 92% or more.

(v-8) is preferably 4% or less, and more preferably 3.5% or less.

In the dielectric multilayer film according to the present invention, the light in the near infrared region is preferably gently shielded as shown in the spectral characteristics (v-4) and (v-5). When the dielectric multilayer film is designed so as to enhance the reflection characteristics in the near infrared region, a ripple is likely to be generated in the visible light region. In the present invention, by designing the dielectric multilayer film such that the light in the near infrared region is not strongly shielded, the ripple in the visible light region is prevented as shown in the spectral characteristics (v-1) to (v-3). The light shielding property of the near infrared light region which cannot be completely shielded by the reflection characteristics of the dielectric multilayer film is complemented by absorption characteristics of a substrate to be described later, and the present invention has excellent near infrared ray shielding property as the entire optical filter.

In the filter, it is preferable that at least one side of the dielectric multilayer film be designed as a near infrared ray reflection layer (hereinafter, also referred to as a NIR reflection layer). It is preferable that the other side of the dielectric multilayer film be designed as a NIR reflection layer, a reflection layer having a reflection region other than the near infrared region, or an antireflection layer.

The NIR reflection layer is a dielectric multilayer film designed to shield light in the near infrared region. The NIR reflection layer has, for example, wavelength selectivity of transmitting visible light and mainly reflecting the light in the near infrared region. A reflection region of the NIR reflection layer may include a light shielding region in the near infrared region of the resin film. The NIR reflection layer is not limited to have NIR reflection characteristics, and may be appropriately designed in a specification of further shielding light in a wavelength region other than the near infrared region, for example, a near ultraviolet region.

The NIR reflection layer is formed of, for example, a dielectric multilayer film in which dielectric films having different refractive indices are alternately laid.

Examples of the dielectric film include a dielectric film having a low refractive index (low refractive index film), a dielectric film having a medium refractive index (medium refractive index film), and a dielectric film having a high refractive index (high refractive index film), and two or more of the dielectric films are preferably laid in combination. Among those, from the viewpoint of enhancing the light shielding property in an infrared region to an extent that no ripple is generated in a visible region, it is preferable to include at least a medium refractive index film.

The high refractive index film preferably has a refractive index of 2.2 or more, and more preferably 2.2 to 2.5. Examples of a material of the high refractive index film include $Ta_2O_5$, $TiO_2$, TiO, $Ti_2O_3$, and $Nb_2O_5$. Other commercial products thereof include OS50 ($Ti_3O_5$), OS10 ($Ti_4O_7$), OA500 (a mixture of $Ta_2O_5$ and $ZrO_2$), and OA600 (a mixture of $Ta_2O_5$ and $TiO_2$) manufactured by Canon Optron, Inc. Among those, $TiO_2$ is preferable from the viewpoint of reproducibility in film formability and refractive index, stability, and the like.

The medium refractive index film preferably has a refractive index of 1.6 to 2.1. Examples of a material of the medium refractive index film include $ZrO_2$, $Nb_2O_5$, $Al_2O_3$, $HfO_2$, OM-4 and OM-6 (mixtures of $Al_2O_3$ and $ZrO_2$) sold by Canon Optron, Inc., OA-100, and H4 and M2 (alumina lanthania) sold by Merck KGaA. Among those, $Al_2O_3$-based compounds and mixtures of $Al_2O_3$ and $ZrO_2$ are preferable from the viewpoint of reproducibility in film formability and refractive index, stability, and the like.

The low refractive index film preferably has a refractive index of 1.5 or less, and more preferably 1.4 to 1.5. Examples of a material of the low refractive index film include $SiO_2$, $SiO_xN_y$, and $MgF_2$. Other commercial products thereof include S4F and S5F (mixtures of $SiO_2$ and $AlO_2$) manufactured by Canon Optron, Inc. Among those, $SiO_2$ is preferable from the viewpoint of reproducibility in film formability, stability, economic efficiency, and the like.

In order to obtain a dielectric multilayer film that satisfies the spectral characteristics (v-1) to (v-5), that is, stable light shielding characteristics in the near infrared light region and low ripple characteristics in the visible light region, several types of dielectric films having different spectral characteristics may be combined when transmitting and selecting a desired wavelength band. Specifically, a reflection ripple in the visible light region can be prevented by reducing a difference in refractive index between layers by materials of a medium refractive index layer and a low refractive index layer. In an infrared ray cut filter in the related art, a low refractive index material and a high refractive index material such as $SiO_2/TiO_2$ are used to enhance the light shielding property in the near infrared light region, but in this configuration, a reflection ripple in the visible light region is likely to occur. In the configuration of the optical filter according to the present invention, since it is possible to lower the transmittance in the near infrared region by the absorption characteristics of the substrate (pigment and absorption glass), there is no need to use a combination of a low refractive index layer and a high refractive index layer in which a ripple is likely to occur in the visible light region.

In the NIR reflection layer, the total number of laid layers of dielectric multilayer films constituting the reflection layer is preferably 20 or more, more preferably 30 or more, and further preferably 35 or more. However, when the total number of laid layers increases, warpage or the like occurs or a film thickness increases, so that the total number of laid layers is preferably 100 or less, more preferably 75 or less, and still more preferably 60 or less.

In addition, the film thickness of the reflection layer is preferably 2 μm to 10 μm as a whole.

For formation of the dielectric multilayer film, for example, a vacuum film formation process such as a CVD method, a sputtering method, or a vacuum deposition method, a wet film formation process such as a spraying method or a dipping method, or the like can be used.

The NIR reflection layer may provide a predetermined optical characteristic by one layer (one group of dielectric multilayer films) or may provide a predetermined optical characteristic by two layers. When two or more NIR reflection layers are provided, the respective reflection layers may have the same configuration or different configurations. In a case where two or more reflection layers are provided, a plurality of reflection layers having different reflection bands are usually provided. In a case where two reflection layers are provided, one of the reflection layers may be a near infrared reflection layer that shields light in a short wavelength band in the near infrared region, and the other of the reflection layers may be a near infrared and near ultraviolet reflection layer that shields light in both a long wavelength band of the near infrared region and the near ultraviolet region.

Examples of the antireflection layer include a dielectric multilayer film, an intermediate refractive index medium, and a moth-eye structure in which the refractive index gradually changes. Among those, the dielectric multilayer film is preferable from the viewpoint of optical efficiency and productivity. The antireflection layer is obtained by alternately laminating dielectric multilayer films in the same manner as the reflection layer.

<Substrate>

In the optical filter according to the present invention, the substrate includes the near infrared ray absorbing glass and the resin film having a thickness of 10 μm or less. The resin film includes the resin and the pigment (NIR1) having a maximum absorption wavelength in 680 nm to 740 nm in the resin, and is laid on or above at least one major surface of the near infrared ray absorbing glass.

<Spectral Characteristics of Substrate>

The substrate preferably satisfies all of the following spectral characteristics (ii-1) to (ii-7):

(ii-1) an average internal transmittance $T_{450\text{-}600AVE}$ at the wavelength of 450 nm to 600 nm is 85% or more, (ii-2) a maximum internal transmittance $T_{450\text{-}600MAX}$ at the wavelength of 450 nm to 600 nm is 92% or more, (ii-3) an internal transmittance $T_{450}$ at the wavelength of 450 nm is 82% or more, (ii-4) a wavelength IR50 at which the internal transmittance is 50% is in a range of 610 nm to 650 nm, (ii-5) an average internal transmittance $T_{750\text{-}1000AVE}$ at a wavelength of 750 nm to 1,000 nm is 1.5% or less, (ii-6) a maximum internal transmittance $T_{1000\text{-}1200MAX}$ at the wavelength of 1,000 nm to 1,200 nm is 5% or less, and (ii-7) the internal transmittance $T_{450}$/the maximum internal transmittance $T_{1000\text{-}1200MAX} \geq 15$.

It means that by satisfying the spectral characteristics (ii-1) and (ii-2), the transmittance in the visible light region of 450 nm to 600 nm is excellent.

$T_{450\text{-}600AVE}$ is preferably 93% or more, and more preferably 95% or more.

$T_{450\text{-}600MAX}$ is preferably 87% or more, and more preferably 88% or more.

It means that by satisfying the spectral characteristic (ii-3), the transmittance in the blue light region is excellent.

$T_{450}$ is preferably 83% or more, and more preferably 84% or more.

It means that by satisfying the spectral characteristic (ii-4), the light in the near infrared region is shielded and visible transmitted light can be efficiently taken in.

IR50 is preferably in a range of 615 nm to 640 nm, and more preferably 615 nm to 635 nm.

It means that by satisfying the spectral characteristic (ii-5), the light shielding property in the near infrared region of 750 nm to 1,000 nm is excellent.

$T_{750\text{-}1000AVE}$ is preferably 1% or less, and more preferably 0.8% or less.

It means that by satisfying the spectral characteristic (ii-6), the light shielding property in the infrared region of 1,000 nm to 1,200 nm is excellent.

$T_{1000\text{-}1200MAX}$ is preferably 4.8% or less, and more preferably 4.5% or less.

It means that by satisfying the spectral characteristic (ii-7), both the transmittance in the visible light region and the light shielding property in the infrared region are achieved.

The internal transmittance $T_{450}$/the maximum internal transmittance $T_{1000\text{-}1200MAX}$ is preferably 17 or more, and more preferably 18 or more.

The substrate preferably further satisfies the following spectral characteristic (ii-8):

(ii-8) a maximum internal transmittance $T_{750\text{-}1000MAX}$ at a wavelength of 750 nm to 1,000 nm is 2% or less.

It means that by satisfying the spectral characteristic (ii-8), the light shielding property in the near infrared region of 750 nm to 1,000 nm is excellent.

$T_{750\text{-}1000MAX}$ is preferably 1.2% or less, and more preferably 0.8% or less.

The substrate preferably further satisfies the following spectral characteristics (ii-9) to (ii-11):

(ii-9) a wavelength UV50 at which an internal transmittance is 50% is in a range of 400 nm to 440 nm, (ii-10) an average internal transmittance $T_{370\text{-}400AVE}$ at the wavelength of 370 nm to 400 nm is 3% or less, and (ii-11) a maximum internal transmittance $T_{370\text{-}400MAX}$ at the wavelength of 370 nm to 400 nm is 5% or less.

It means that by satisfying the spectral characteristic (ii-9), the light in the near ultraviolet region is shielded and visible transmitted light can be efficiently taken in.

UV50 is preferably in a range of 400 nm to 430 nm, and more preferably 410 nm to 430 nm.

It means that by satisfying the spectral characteristics (ii-10) and (ii-11), the light shielding property in the near ultraviolet region of 370 nm to 400 nm is excellent.

$T_{370\text{-}400AVE}$ is preferably 2% or less, and more preferably 1% or less.

$T_{370\text{-}400MAX}$ is preferably 4.5% or less, and more preferably 4% or less.

In the present invention, the substrate has excellent transmittance in the visible light region as shown in the above-mentioned spectral characteristics (ii-1) to (ii-3) and excellent light shielding property in the near infrared light region and the infrared light region as shown in the spectral characteristics (ii-5) to (ii-6), and achieves both the transmittance and the light shielding property as shown in the spectral characteristic (ii-7). In particular, since the light shielding property in the near infrared light region and the infrared light region is high, the light shielding property of the dielectric multilayer film described above can be compensated.

In the present invention, the substrate has both an absorption ability of the near infrared ray absorbing glass and an absorption ability of the resin film containing the near infrared ray absorbing pigment (NIR1).

<Near Infrared Ray Absorbing Glass>

The near infrared ray absorbing glass preferably satisfies all of the following spectral characteristics (iii-1) to (iii-6):

(iii-1) an average internal transmittance $T_{450\text{-}600AVE}$ at the wavelength of 450 nm to 600 nm is 90% or more, (iii-2) an internal transmittance $T_{450}$ at the wavelength of 450 nm is 92% or more, (iii-3) a wavelength IR50 at which an internal transmittance is 50% is in a range of 625 nm to 650 nm, (iii-4) an average internal transmittance $T_{750\text{-}1000AVE}$ at a wavelength of 750 nm to 1,000 nm is 2.5% or less, (iii-5) a maximum internal transmittance $T_{1000\text{-}1200MAX}$ at the wavelength of 1,000 nm to 1,200 nm is 5% or less, and (iii-6) the internal transmittance $T_{450}$/the maximum internal transmittance $T_{1000\text{-}1200MAX} \geq 10$.

It means that by satisfying the spectral characteristic (iii-1), the transmittance in the visible light region of 450 nm to 600 nm is excellent, and by satisfying the spectral characteristic (iii-2), the transmittance in the blue light region is excellent.

$T_{450\text{-}600AVE}$ is preferably 94% or more, and more preferably 95% or more.

$T_{450}$ is preferably 83% or more, and more preferably 85% or more.

It means that by satisfying the spectral characteristic (iii-3), the light in the near infrared region is shielded and visible transmitted light can be efficiently taken in.

IR50 is preferably in a range of 625 nm to 645 nm, and more preferably 625 nm to 640 nm.

It means that by satisfying the spectral characteristic (iii-4), the light shielding property in the near infrared region of 750 nm to 1,000 nm is excellent.

$T_{750\text{-}1000AVE}$ is preferably 2% or less, and more preferably 1.2% or less.

It means that by satisfying the spectral characteristic (iii-5), the light shielding property in the infrared region of 1,000 nm to 1,200 nm is excellent.

$T_{1000\text{-}1200MAX}$ is preferably 4.8% or less, and more preferably 4.5% or less.

It means that by satisfying the spectral characteristic (iii-6), both the transmittance in the visible light region and the light shielding property in the infrared region are achieved.

$T_{450}/T_{1000\text{-}1200MAX}$ is preferably 15 or more, and more preferably 18 or more.

In the present invention, it is preferable that the near infrared ray absorbing glass start to absorb near infrared light from a region of 625 nm to 650 nm as shown in the above-mentioned characteristic (iii-3), and exhibit high light shielding property after 750 nm as shown in the above-mentioned characteristic (iii-4). Accordingly, a substrate capable of compensating for the light shielding property of the above-described dielectric multilayer film is obtained.

The near infrared ray absorbing glass is not limited as long as it is glass capable of obtaining the above-mentioned spectral characteristics, and examples thereof include an absorption type glass containing a copper ion, such as a fluorophosphate glass or a phosphate glass. Among those, the phosphate glass is preferable from the viewpoint of easily obtaining the above-mentioned spectral characteristics. The "phosphate glass" also includes a silicate glass in which a part of a skeleton of the glass is formed of $SiO_2$.

For example, it is preferable that the phosphate glass contain components constituting the following glass. Respective content ratios of the following glass constituent components are expressed in mass % in terms of oxides.

$P_2O_5$ is a main component (glass-forming oxide) that forms the glass, and is an essential component for enhancing the near infrared cut property, but when the content ratio thereof is less than 65%, the effect cannot be sufficiently obtained, and when the content ratio thereof is more than 74%, a melting temperature increases and the transmittance in the visible region is reduced, which is not preferable. The content ratio thereof is preferably 67% to 73%, and more preferably 68% to 72%.

$Al_2O_3$ is an essential component for enhancing weather resistance, but when the content ratio thereof is less than 5%, the effect cannot be sufficiently obtained, and when the content ratio thereof is more than 10%, the melting temperature of the glass increases, and the near infrared cut property and visible region transmittance are reduced, which is not preferable. The content ratio thereof is preferably 6% to 10%, and more preferably 7% to 9%.

$B_2O_3$ is an essential component for lowering the melting temperature of the glass, but when the content ratio thereof is less than 0.5%, the effect cannot be sufficiently obtained, and when the content ratio thereof is more than 3%, the near infrared cut property is reduced, which is not preferable. The content ratio thereof is preferably 0.7% to 2.5%, and more preferably 0.8% to 2.0%.

$Li_2O$ is not an essential component but has an effect of lowering the melting temperature of the glass, but when the content ratio thereof is more than 10%, the glass becomes unstable, which is not preferable. The content ratio thereof is preferably 0% to 5%, and more preferably 0% to 3%.

$Na_2O$ is an essential component for lowering the melting temperature of the glass, but when the content ratio thereof is less than 3%, the effect cannot be sufficiently obtained, and when the content ratio thereof is more than 10%, the glass becomes unstable, which is not preferable. The content ratio thereof is preferably 4% to 9%, and more preferably 5% to 9%

$Li_2O+Na_2O$ are essential components for lowering the melting temperature of the glass, but when the content ratio thereof is less than 3%, the effect is insufficient, and when the content ratio thereof is more than 15%, the glass becomes unstable, which is not preferable. The content ratio thereof is preferably 4% to 13%, and more preferably 5% to 10%.

MgO is not an essential component but has an effect of enhancing stability of the glass, but when the content ratio thereof is more than 2%, the near infrared cut property is reduced, which is not preferable. The content ratio thereof is preferably 1% or less, and more preferably not contained.

CaO is not an essential component but has an effect of enhancing the stability of the glass, but when the content ratio thereof is more than 2%, the near infrared cut property is reduced, which is not preferable. The content ratio thereof is preferably 1.5% or less, and more preferably not contained.

SrO is not an essential component but has an effect of enhancing the stability of the glass, but when the content ratio thereof is more than 5%, the near infrared cut property is reduced, which is not preferable. The content ratio thereof is preferably 0% to 4%, and more preferably 0% to 3%.

BaO is an essential component for lowering the melting temperature of the glass, but when the content ratio thereof is less than 3%, the effect cannot be sufficiently obtained, and when the content ratio thereof is more than 9%, the glass becomes unstable, which is not preferable. The content ratio thereof is preferably 3% to 8%, and more preferably 4% to 8%.

MgO+CaO+SrO+BaO are essential components for enhancing the stability of the glass and lowering the melting temperature of the glass, but when the content ratio thereof is less than 3%, the effect is insufficient, and when the content ratio thereof is more than 15%, the glass becomes unstable, which is not preferable. The content ratio thereof is preferably 3% to 12%, and more preferably 4% to 10%.

CuO is an essential component for enhancing the near infrared cut property, but when the content ratio thereof is less than 0.5%, the effect cannot be sufficiently obtained, and when the content ratio thereof exceeds 20%, the visible region transmittance is reduced, which is not preferable. The content ratio thereof is preferably 1% to 15%, and more preferably 2% to 10%. The content ratio thereof is most preferably 3% to 9%.

$K_2O$ is preferably not substantially contained in the phosphate glass. $K_2O$ is known for an effect of lowering the melting temperature of the glass. However, the present inventors have confirmed that when the phosphate glass contains both $K_2O$ and $Na_2O$, the melting temperature of the glass is higher than that in a case where the phosphate glass contains only $Na_2O$ without containing $K_2O$. The reason for this is considered as follows. In a case where equimolar $P_2O_5$ and $Na_2O$ are mixed, a liquid phase temperature is about 628° C., from a phase diagram of a two-component system. In contrast, in a case where equimolar $P_2O_5$ and $K_2O$ are mixed, the liquid phase temperature exceeds 800° C., from the phase diagram of a two-component system. This suggests that when a part of $Na_2O$ is substituted with $K_2O$ in the phosphate glass, the liquid phase temperature tends to increase and the melting temperature also increases. It should be noted that the expression "substantially not contained" in the present invention means not intentionally used as a raw material, and it is considered that raw material components and inevitable impurities mixed from a manufacturing process are substantially not contained. In addition, in consideration of the inevitable impurities, the expression "substantially not contained" means that a content thereof is 0.05% or less.

In the phosphate glass, in order to obtain spectral characteristics in which the visible region transmittance is high and the transmittance of light in the near infrared region is low, regarding copper ions in glass components, it is important to make $Cu^{2+}$ that absorbs light in the near infrared region exist as much as possible as compared with $Cu^{+}$ that absorbs light in the ultraviolet region and causes reduction in the visible region transmittance.

Copper in the glass components tends to be reduced, that is, $Cu^{2+}$ is reduced to become $Cu^{+}$ as the melting temperature of the glass increases. Therefore, in order to make $Cu^{2+}$ exist as much as possible, it is effective to make the melting temperature of the glass as low as possible. The melting temperature of near infrared ray cut filter glass of the present invention is preferably 1,150° C. or lower, more preferably 1,100° C. or lower, and further preferably 1,080° C. or lower.

Therefore, in contrast to $Al_2O_3$ having an effect of increasing the melting temperature of the glass, a ratio of BaO and $B_2O_3$ having an effect of lowering the melting temperature of the glass is increased. A balance in these glass components is achieved by increasing $(BaO+B_2O_3)/Al_2O_3$, but in a case where $(BaO+B_2O_3)/Al_2O_3$ is too large, the weather resistance is reduced, and thus a ratio thereof is in a range of 0.3 to 2.4. Further, the ratio thereof is preferably 0.3 to 2.0, and more preferably 0.5 to 1.5.

In the phosphate glass, in order to obtain spectral characteristics in which the visible region transmittance is high and the transmittance of light in the near infrared region is low, specifically, a steep cutoff characteristic of light in the vicinity of 600 nm to 700 nm, it is important to reduce distortion of a six-coordination structure of $Cu^{2+}$ in the glass and cause an absorption peak of $Cu^{2+}$ to move to a long wavelength side, that is, to further increase absorption of light in the near infrared region by $Cu^{2+}$ in the glass.

Therefore, in order to reduce the distortion of the six-coordination structure of $Cu^{2+}$ in the glass, it was considered that it is necessary that the number of non-crosslinking oxygen in the glass is large and field strength (field strength is a value obtained by dividing a valence Z by a square of an ionic radius r: $Z/r^2$, which represents a degree of strength of a cation attracting oxygen) of a modified oxide is small.

In order to increase the number of non-crosslinking oxygen in the glass, it is necessary to increase an amount of $P_2O_5$ in a mesh-like oxide forming a network of the glass as compared with other mesh-like oxides. Since $P_2O_5$ contains a larger amount of oxygen in a molecule than $Al_2O_3$ and $B_2O_3$, $Cu^{2+}$ tends to distribute the non-crosslinking oxygen, and the distortion around $Cu^{2+}$ becomes small. On the other hand, in order to enhance the weather resistance of the glass, it is effective to increase $Al_2O_3$, which affects the weather resistance, in a ratio to $P_2O_5$.

Therefore, a balance of the mesh-like oxide contained in the glass is that $P_2O_5/Al_2O_3$ is in a range of 6.5 to 10. Further, the ratio thereof is preferably 7 to 10, and more preferably 7 to 9.5.

In addition, it is known that the smaller the field strength of the modified oxide in the glass, the smaller a wavenumber of the absorption peak, and the higher absorptivity of light in the near infrared region of $Cu^{2+}$. Therefore, it is effective to contain more $Na_2O$ having relatively small field strength than other modified oxides.

From such a viewpoint, the balance of the modified oxides contained in the glass can be that $Na^2O/(Li_2O+MgO+CaO+SrO+BaO)$ is increased, but in a case where $Na_2O/(Li_2O+MgO+CaO+SrO+BaO)$ is too large, the weather resistance is reduced, and thus the ratio thereof is in a range of 0.5 to 3. Further, the ratio thereof is preferably 0.5 to 2.5, and more preferably 0.7 to 2.

In addition, as the near infrared ray absorbing glass, a chemically strengthened glass may be used which is obtained by exchanging alkali metal ions (for example, Li ions and Na ions) having a small ionic radius present on a major surface of a glass plate with alkali ions having a larger ionic radius (for example, Na ions or K ions with respect to Li ions and K ions with respect to Na ions) by ion exchange at a temperature equal to or lower than a glass transition point.

The thickness of the near infrared ray absorbing glass is preferably 0.5 mm or less, more preferably 0.3 mm or less from the viewpoint of reduction in height of camera modules, and is preferably 0.15 mm or more from the viewpoint of element strength.

<Resin Film>

The resin film preferably satisfies all of the following spectral characteristics (iv-1) to (iv-5):

(iv-1) an average internal transmittance $T_{450\text{-}600AVE}$ at the wavelength of 450 nm to 600 nm is 93% or more, (iv-2) a maximum internal transmittance $T_{450\text{-}600MAX}$ at the wavelength of 450 nm to 600 nm is 95% or more, (iv-3) an internal transmittance $T_{450}$ at the wavelength of 450 nm is 86% or more, (iv-4) $IR50_{(L)}-IR50_{(S)}\geq 90$ nm where $IR50_{(S)}$ is a shortest wavelength and $IR50_{(L)}$ is a longest wavelength at which an internal transmittance is 50% in a spectral transmittance curve at a wavelength of 650 nm to 900 nm, and (iv-5) a minimum internal transmittance $T_{700\text{-}800MIN}$ at a wavelength of 700 nm to 800 nm is 10% or less.

It means that by satisfying the spectral characteristics (iv-1) and (iv-2), the transmittance in the visible light region of 450 nm to 600 nm is excellent.

$T_{450\text{-}600AVE}$ is preferably 94% or more, and more preferably 95% or more.

$T_{450\text{-}600MAX}$ is preferably 96% or more, and more preferably 97% or more.

It means that by satisfying the spectral characteristic (iv-3), the transmittance in the blue light region is excellent.

$T_{450}$ is preferably 87% or more, and more preferably 88% or more.

It means that by satisfying the spectral characteristic (iv-4), the near infrared light region in the vicinity of 700 nm can be widely shielded.

$IR50_{(L)}-IR50_{(S)}$ is preferably 95 nm or more, and more preferably 105 nm or more.

It means that by satisfying the spectral characteristic (iv-5), the light shielding property in the near infrared region of 700 nm to 800 nm is excellent.

$T_{700\text{-}800MIN}$ is preferably 9% or less, and more preferably 7% or less.

The resin film preferably further satisfies the following spectral characteristics (iv-6) and (iv-7):

(iv-6) the wavelength $IR50_{(S)}$ at which the internal transmittance is 50% is in a range of 650 nm to 700 nm, and (iv-7) the wavelength $IR50_{(L)}$ at which the internal transmittance is 50% is in a range of 740 nm to 850 nm.

It means that by satisfying the spectral characteristics (iv-6) and (iv-7), the near infrared light region in the vicinity of 700 nm can be efficiently shielded.

$IR50_{(S)}$ is preferably 650 nm to 690 nm, and more preferably 660 nm to 690 nm.

$IR50_{(L)}$ is preferably 750 nm to 830 nm, and more preferably 760 nm to 830 nm.

The resin film preferably further satisfies the following spectral characteristic (iv-8):

(iv-8) an average internal transmittance $T_{700\text{-}800AVE}$ at a wavelength of 700 nm to 800 nm is 30% or less.

It means that by satisfying the spectral characteristic (iv-8), the light shielding property in the near infrared region of 700 nm to 800 nm is excellent.

$T_{700\text{-}800AVE}$ is preferably 2.8% or less, and more preferably 2.5% or less.

The resin film preferably further satisfies the following spectral characteristics (iv-9) to (iv-11):

(iv-9) the wavelength UV50 at which the internal transmittance is 50% is in a range of 400 nm to 440 nm, (iv-10) the average internal transmittance $T_{370\text{-}400AVE}$ at the wavelength of 370 nm to 400 nm is 3% or less, and (iv-11) the maximum internal transmittance $T_{370\text{-}400MAX}$ in the wavelength range of 370 nm to 400 nm is 5% or less.

It means that by satisfying the spectral characteristics (iv-9) to (iv-11), the light shielding property in the near ultraviolet region of 370 nm to 400 nm is excellent. UV50 is preferably in a range of 400 nm to 430 nm, and more preferably 410 nm to 430 nm.

$T_{370\text{-}400AVE}$ is preferably 2% or less, and more preferably 1% or less.

$T_{370\text{-}400MAX}$ is preferably 4.8% or less, and more preferably 4.6% or less.

Since the resin film in the present invention contains the pigment (NIR1) having the maximum absorption wavelength in the range of 680 nm to 740 nm, as shown in the characteristics (iv-4) and (iv-5), the resin film is particularly excellent in wide range light shielding property in the near infrared light region in the vicinity of 700 nm. Accordingly, in a case of the infrared ray absorbing glass, the near infrared light region in the vicinity of 700 nm where the light shielding property is slightly weak can be shielded by the absorption characteristics of the pigment.

The pigment (NIR1) has a maximum absorption wavelength of 680 nm to 740 nm, preferably 700 nm to 730 nm in the resin. Here, the resin refers to a resin constituting the resin film.

The NIR pigment may be constituted of one kind of compound or may include two or more kinds of compounds.

Here, the resin film in the present invention preferably further contains, in addition to the pigment (NIR1), another near infrared ray absorbing pigment having a different maximum absorption wavelength. As a result, the resin film can obtain the wide range light shielding property in the near infrared light region in the vicinity of 700 nm, and the characteristic (iv-4) is easily obtained. The another near infrared ray absorbing pigment is preferably a pigment (NIR2) having a maximum absorption wavelength in the resin longer than that of the pigment (NIR1) by 20 nm to 60 nm. In addition, the maximum absorption wavelength of the pigment (NIR2) is preferably 700 nm to 800 nm.

The pigment (NIR1) is preferably a squarylium compound from the viewpoint of a region of the maximum absorption wavelength, transmittance in the visible light region, solubility in a resin, and durability. The maximum absorption wavelength of the squarylium compound as the pigment (NIR1) is preferably 680 nm to 740 nm.

The pigment (NIR2) is preferably a squarylium compound and a cyanine compound from the viewpoint of the region of the maximum absorption wavelength, transmittance in the visible light region, solubility in a resin, and durability. In addition, the maximum absorption wavelength of the squarylium compound as the pigment (NIR2) is preferably 740 nm to 770 nm. The maximum absorption wavelength of the cyanine compound as the pigment (NIR2) is preferably 740 nm to 800 nm.

<NIR1: Squarylium Compound>

The squarylium compound as the pigment (NIR1) is preferably a compound represented by the following formula (1).

When two or more identical symbols are present in the squarylium compound, the symbols may be the same or different. The same applies to the cyanine compound.

<Squarylium Compound (I)>

(I)

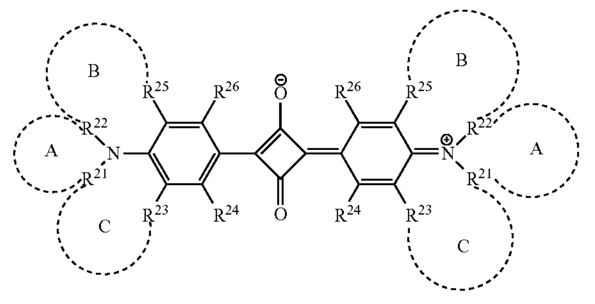

Here, symbols in the above-mentioned formula are as follows.

$R^{24}$ and $R^{26}$ each independently represent a hydrogen atom, a halogen atom, a hydroxyl group, an alkyl group or an alkoxy group having 1 to 20 carbon atoms, an acyloxy group having 1 to 10 carbon atoms, an aryl group having 6 to 11 carbon atoms, an alaryl group having 7 to 18 carbon atoms which may have a substituent and may have an oxygen atom between carbon atoms, $—NR^{27}R^{28}$ ($R^{27}$ and $R^{28}$ each independently represent a hydrogen atom, an alkyl group having 1 to 20 carbon atoms, $—C(═O)—R^{29}$ ($R^{29}$ is a hydrocarbon group having 1 to 25 carbon atoms which may have a hydrogen atom, a halogen atom, a hydroxyl group, or a substituent, and may have an unsaturated bond, an oxygen atom, or a saturated or unsaturated ring structure between carbon atoms), $—NHR^{30}$ or $—SO_2—R^{30}$ ($R^{30}$ is a hydrocarbon group having 1 to 25 carbon atoms in which one or more hydrogen atoms may be substituted with a halogen atom, a hydroxyl group, a carboxy group, a sulfo group, or a cyano group, and may have an unsaturated bond, an oxygen atom, or a saturated or unsaturated ring structure between carbon atoms)), or a group represented by the following formula (S) ($R^{41}$ and $R^{42}$ each independently represent a hydrogen atom, a halogen atom, or an alkyl group or an alkoxy group having 1 to 10 carbon atoms. K is 2 or 3).

(S)

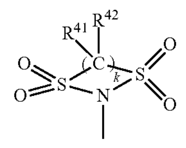

$R^{21}$ and $R^{22}$, $R^{22}$ and $R^{25}$, as well as $R^{21}$ and $R^{23}$ may each be linked to each other to respectively form a heterocycle A, a heterocycle B, and a heterocycle C, in which the number of members is 5 or 6 together with nitrogen atoms.

$R^{21}$ and $R^{22}$ in a case where the heterocycle A is formed represent, as a divalent group -Q- to which $R^{21}$ and $R^{22}$ are bonded, an alkylene group or an alkyleneoxy group in which a hydrogen atom may be substituted with an alkyl group having 1 to 6 carbon atoms, an aryl group having 6 to 10 carbon atoms, or an acyloxy group having 1 to 10 carbon atoms which may have a substituent.

$R^{22}$ and $R^{25}$ in a case where the heterocycle B is formed as well as $R^{21}$ and $R^{23}$ in a case where the heterocycle C is formed represent divalent groups $—X^1—Y^1—$ and $—X^2—Y^2—$ to which $R^{22}$ and $R^{25}$ as well as $R^{21}$ and $R^{23}$ are bonded (a side bonded to nitrogen is $X^1$ or $X^2$), each of $X^1$ and $X^2$ is a group represented by the following formula (1x) or (2x), and each of $Y^1$ and $Y^2$ is a group represented by any of those selected from the following formulae (1y) to (5y). In a case where each of $X^1$ and $X^2$ is a group represented by the following formula (2x), each of $Y^1$ and $Y^2$ may be a single bond, and may have an oxygen atom between carbon atoms in this case.

(1x)

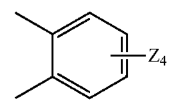

(2x)

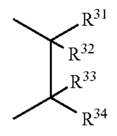

-continued (1y)

(2y)

(3y)

(4y)

(5y)

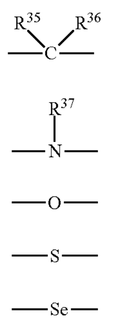

In the formula (1x), four Zs each independently represent a hydrogen atom, a hydroxyl group, an alkyl group or an alkoxy group having 1 to 6 carbon atoms, or $—NR^{38}R^{39}$ ($R^{38}$ and $R^{39}$ each independently represent a hydrogen atom or an alkyl group having 1 to 20 carbon atoms). $R^{31}$ to $R^{36}$ each independently represent a hydrogen atom, an alkyl group having 1 to 6 carbon atoms, or an aryl group having 6 to 10 carbon atoms, and $R^{37}$ represents an alkyl group having 1 to 6 carbon atoms or an aryl group having 6 to 10 carbon atoms.

$R^{21}$ to $R^{23}$ and $R^{25}$ in a case where no heterocycle is formed, $R^{27}$, $R^{28}$, $R^{29}$, and $R^{31}$ to $R^{37}$ may be bonded to any other among those to form a 5-membered ring or a 6-membered ring. $R^{31}$ and $R^{36}$, as well as $R^{31}$ and $R^{37}$ may be directly bonded.

$R^{21}$, $R^{22}$, $R^{23}$, and $R^{25}$ in the case where no heterocycle is formed each independently represent a hydrogen atom, a halogen atom, a hydroxyl group, an alkyl group or an alkoxy group having 1 to 20 carbon atoms, an acyloxy group having 1 to 10 carbon atoms, an aryl group having 6 to 11 carbon atoms, or an alaryl group having 7 to 18 carbon atoms which may have a substituent and may have an oxygen atom between carbon atoms.

Examples of the compound (I) include a compound represented by any one of formulae (I-1) to (I-3), and the compound represented by the formula (I-1) is particularly preferable from the viewpoint of solubility in a resin, heat resistance and light resistance in a resin, and visible light transmittance of a resin layer containing the same.

(I-1)

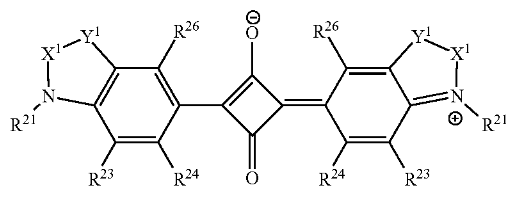

(I-2)

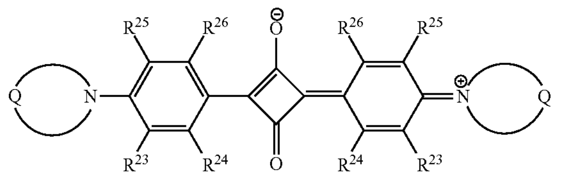

-continued (I-3)

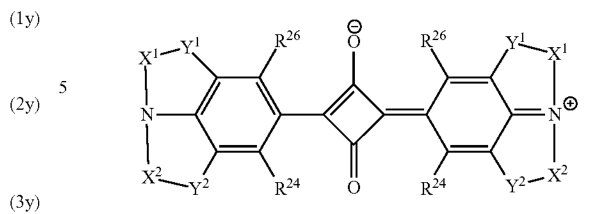

For symbols in the formulae (I-1) to (I-3), respective specifications thereof are the same as those for the same symbols in the formula (I), and preferred embodiments are also the same.

In the compound (I-1), $X^1$ is preferably a group (2x), and $Y^1$ is preferably a single bond or a group (1y). In this case, $R^{31}$ to $R^{36}$ are preferably hydrogen atoms or alkyl groups having 1 to 3 carbon atoms, and more preferably hydrogen atoms or methyl groups. Specific examples of $—Y^1—X^1$ include divalent organic groups represented by formulae (11-1) to (12-3).

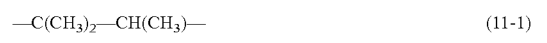

$—C(CH_3)_2—CH(CH_3)—$ (11-1)

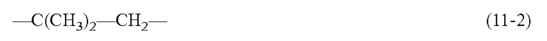

$—C(CH_3)_2—CH_2—$ (11-2)

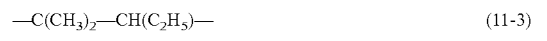

$—C(CH_3)_2—CH(C_2H_5)—$ (11-3)

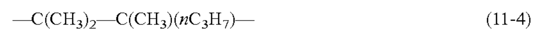

$—C(CH_3)_2—C(CH_3)(nC_3H_7)—$ (11-4)

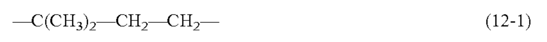

$—C(CH_3)_2—CH_2—CH_2—$ (12-1)

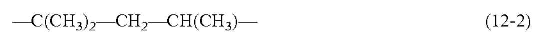

$—C(CH_3)_2—CH_2—CH(CH_3)—$ (12-2)

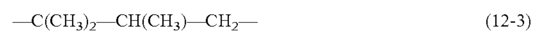

$—C(CH_3)_2—CH(CH_3)—CH_2—$ (12-3)

In addition, in the compound (I-1), $R^{21}$ is independently more preferably a group represented by a formula (4-1) or (4-2) from the viewpoint of solubility, heat resistance, and further steepness of change in the vicinity of a boundary between the visible region and the near infrared region in a spectral transmittance curve.

(4-1)

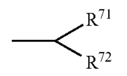

(4-2)

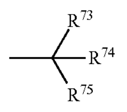

In the formulae (4-1) and (4-2), $R^{71}$ to $R^{75}$ independently represent a hydrogen atom, a halogen atom, or an alkyl group having 1 to 4 carbon atoms.

In the compound (I-1), $R^{24}$ is preferably $—NR^{27}R^{28}$. As $—NR^{27}R^{28}$, $—NH—C(═O)—R^{29}$ or $—NH—SO_2—R^{30}$ is preferable from the viewpoint of solubility in a resin and a coating solvent.

In the compound (I-1), a compound in which $R^{24}$ is $—NH—C(═O)—R^{29}$ is shown in a formula (I-11).

(I-11)

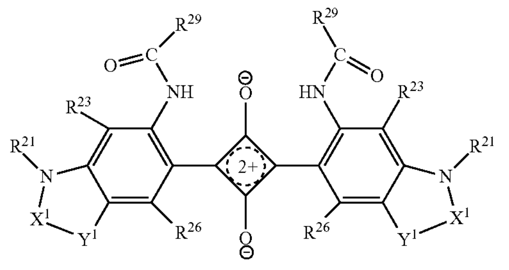

$R^{23}$ and $R^{26}$ are each independently preferably a hydrogen atom, a halogen atom, or an alkyl group or an alkoxy group having 1 to 6 carbon atoms, and both are more preferably a hydrogen atom.

$R^{29}$ is preferably an alkyl group having 1 to 20 carbon atoms which may have a substituent, an aryl group having 6 to 10 carbon atoms which may have a substituent, or an alaryl group having 7 to 18 carbon atoms which may have a substituent and may have an oxygen atom between carbon atoms. Examples of the substituent include a hydroxyl group, a carboxy group, a sulfo group, a cyano group, an alkyl group having 1 to 6 carbon atoms, a fluoroalkyl group having 1 to 6 carbon atoms, an alkoxy group having 1 to 6 carbon atoms, and an acyloxy group having 1 to 6 carbon atoms.

$R^{29}$ is preferably a group selected from a linear, branched, or cyclic alkyl group having 1 to 17 carbon atoms, a phenyl group which may be substituted with an alkoxy group having 1 to 6 carbon atoms, and an alaryl group having 7 to 18 carbon atoms which may have an oxygen atom between carbon atoms.

As $R^{29}$, a group which is a hydrocarbon group having 5 to 25 carbon atoms having at least one or more branches can also be preferably used in which one or more hydrogen atoms may be independently substituted with a hydroxyl group, a carboxy group, a sulfo group, or a cyano group, and may have an unsaturated bond, an oxygen atom, or a saturated or unsaturated ring structure between carbon atoms.

More specific examples of the compound (I-11) include compounds shown in the following table. In addition, in the compounds shown in the following table, meanings of respective symbols are the same on the left and right sides of a squarylium skeleton.

TABLE 1

| Pigment | Substituent | | | | |
|---|---|---|---|---|---|
| abbreviation | —$Y^1$—$X^1$— | $R^{21}$ | $R^{29}$ | $R^{23}$ | $R^{26}$ |
| (I-11-1) | —$C(CH_3)_2$—$C(CH_3)(nC_3H_7)$— | —$CH_3$ | —$CH(C_2H_5)(nC_4H_9)$ | H | H |
| (I-11-2) | —$C(CH_3)_2$—$C(CH_3)(nC_3H_7)$— | —$C_2H_5$ | —$CH(C_2H_5)(nC_4H_9)$ | H | H |
| (I-11-3) | —$C(CII_3)_2$—$C(CII_3)(nC_3II_7)$— | —$nC_3II_7$ | —$CII(C_2II_5)(nC_4II_9)$ | II | II |
| (I-11-4) | —$C(CH_3)_2$—$C(CH_3)(nC_3H_7)$— | —$CH(CH_3)_2$ | —$CH(C_2H_5)(nC_4H_9)$ | H | H |
| (I-11-5) | —$C(CH_3)_2$—$C(CH_3)(nC_3H_7)$— | —$CH_3$ | —$nC_7H_{15}$ | H | H |
| (I-11-6) | —$C(CH_3)_2$—$C(CH_3)(nC_3H_7)$— | —$C_2H_5$ | —$nC_7H_{15}$ | H | H |
| (I-11-7) | —$C(CH_3)_2$—$C(CH_3)(nC_3H_7)$— | —$nC_3H_7$ | —$nC_7H_{15}$ | H | H |
| (I-11-8) | —$C(CH_3)_2$—$C(CH_3)(nC_3H_7)$— | —$CH(CH_3)_2$ | —$nC_7H_{15}$ | H | H |
| (I-11-9) | —$C(CH_3)_2$—$C(CH_3)(nC_3H_7)$— | —$CH_3$ | —$CH_3$ | H | H |
| (I-11-10) | —$C(CH_3)_2$—$C(CH_3)(nC_3H_7)$— | —$C_2H_5$ | —$CH_3$ | H | H |
| (I-11-11) | —$C(CH_3)_2$—$C(CH_3)(nC_3H_7)$— | —$nC_3H_7$ | —$CH_3$ | H | H |
| (I-11-12) | —$C(CII_3)_2$—$C(CII_3)(nC_3II)$— | —$CII(CII_3)_2$ | —$CII_3$ | II | II |
| (I-11-13) | —$C(CH_3)_2$—$C(CII_3)(nC_3H_7)$— | —$CH_3$ | —$CF_3$ | H | H |
| (I-11-14) | —$C(CH_3)_2$—$C(CH_3)(nC_3II_7)$— | —$C_2H_5$ | —$CF_3$ | H | H |
| (I-11-15) | —$C(CH_3)_2$—$C(CH_3)(nC_3H_7)$— | —$nC_3H_7$ | —$CF_3$ | H | H |
| (I-11-16) | —$C(CH_3)_2$—$C(CH_3)(nC_3H_7)$— | —$CH(CH_3)_2$ | —$CF_3$ | H | H |
| (I-11-17) | —$C(CH_3)_2$—$CH(CH_3)$— | —$CH_3$ | —$CH(C_2H_5)(nC_4H_9)$ | H | H |
| (I-11-18) | —$C(CH_3)_2$—$CH(CH_3)$— | —$C_2H_5$ | —$CH(C_2H_5)(nC_4H_9)$ | H | H |
| (I-11-19) | —$C(CII_3)_2$—$CII(CII_3)$— | —$nC_3II_7$ | —$CII(C_2II_5)(nC_4II_9)$ | II | II |
| (I-11-20) | —$C(CH_3)_2$—$CH(CH_3)$— | —$CH(CH_3)_2$ | —$CH(C_2H_5)(nC_4H_9)$ | H | H |
| (I-11-21) | —$C(CH_3)_2$—$CH(CH_3)$— | —$CH_3$ | —$nC_7H_{15}$ | H | H |
| (I-11-22) | —$C(CH_3)_2$—$CH(CH_3)$— | —$C_2H_5$ | —$nC_7H_{15}$ | H | H |
| (I-11-23) | —$C(CH_3)_2$—$CH(CH_3)$— | —$nC_3H_7$ | —$nC_7H_{15}$ | H | H |
| (I-11-24) | —$C(CH_3)_2$—$CH(CH_3)$— | —$CH(CH_3)_2$ | —$nC_7H_{15}$ | H | H |
| (I-11-25) | —$C(CH_3)_2$—$CH(CH_3)$— | —$CH_3$ | —$CH_3$ | H | H |
| (I-11-26) | —$C(CH_3)_2$—$CH(CH_3)$— | —$C_2H_5$ | —$CH_3$ | H | H |
| (I-11-27) | —$C(CH_3)_2$—$CH(CH_3)$— | —$nC_3H_7$ | —$CH_3$ | H | H |
| (I-11-28) | —$C(CH_3)_2$—$CH(CH_3)$— | —$CH(CH_3)_2$ | —$CH_3$ | H | H |
| (I-11-29) | —$C(CH_3)_2$—$CH(CH_3)$— | —$CH_3$ | —$CF_3$ | H | H |
| (I-11-30) | —$C(CH_3)_2$—$CH(CH_3)$— | —$C_2H_5$ | —$CF_3$ | H | H |
| (I-11-31) | —$C(CH_3)_2$—$CH(CH_3)$— | —$nC_3H_7$ | —$CF_3$ | H | H |
| (I-11-32) | —$C(CH_3)_2$—$CH(CH_3)$— | —$CH(CH_3)_2$ | —$CF_3$ | H | H |

The compound (I-11) is, among these compounds, preferably compounds (1-11-1) to (1-11-12) and compounds (1-11-17) to (1-11-28) from the viewpoint of solubility in a resin, maximum absorption wavelength, light resistance, and heat resistance and from the viewpoint of high absorbance, and particularly preferably the compounds (1-11-1) to (1-11-12) from the viewpoint of light resistance and heat resistance. In the configuration of the present invention, since the light shielding property of the dielectric multilayer film in an ultraviolet region is moderate, the light resistance of the pigment is particularly important.

<NIR2: Squarylium Compound>

The squarylium compound as the pigment (NIR2) is preferably a compound represented by the following formula (II).

<Squarylium Compound (II)>

(II)

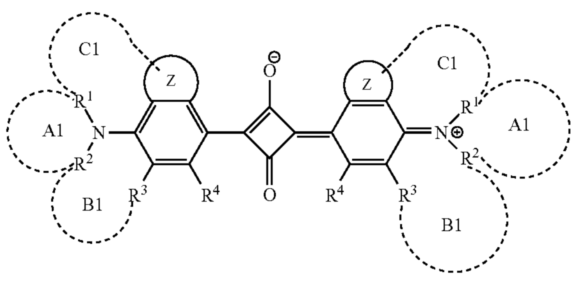

Here, symbols in the above-mentioned formula are as follows.

Each ring Z is independently a 5-membered ring or a 6-membered ring having 0 to 3 heteroatoms in the ring, and a hydrogen atom of the ring Z may be substituted.

Carbon atoms or heteroatoms constituting $R^1$ and $R^2$, $R^2$ and $R^3$, as well as $R^1$ and the ring Z may be linked to each other to respectively form a heterocyclic ring A1, a heterocyclic ring B1, and a heterocyclic ring C1 together with a nitrogen atom, and in this case, the hydrogen atoms of the heterocyclic ring A1, the heterocyclic ring B1, and the heterocyclic ring C1 may be substituted. $R^1$ and $R^2$ in a case where no heterocyclic ring is formed each independently represent a hydrogen atom, a halogen atom, or a hydrocarbon group which may have an unsaturated bond, a heteroatom, a saturated or unsaturated ring structure between carbon atoms and may have a substituent. $R^3$ in the case where no heterocyclic ring is formed and $R^4$ each independently represent a hydrogen atom, a halogen atom, or an alkyl group or an alkoxy group which may have a heteroatom between carbon atoms and may have a substituent.

Examples of the compound (II) include a compound represented by any one of formulae (II-1) to (II-3), and a compound represented by the formula (II-3) is particularly preferable from the viewpoint of solubility in a resin and visible light transmittance in a resin.

(II-1)

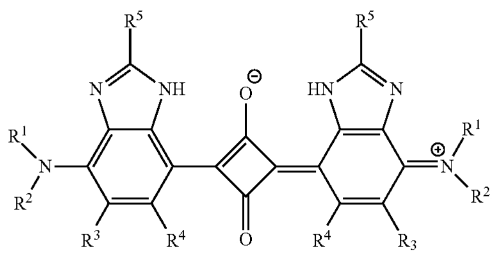

-continued (II-2)

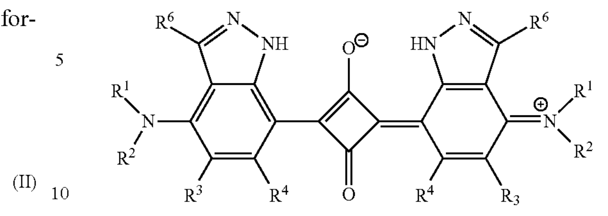

(II-3)

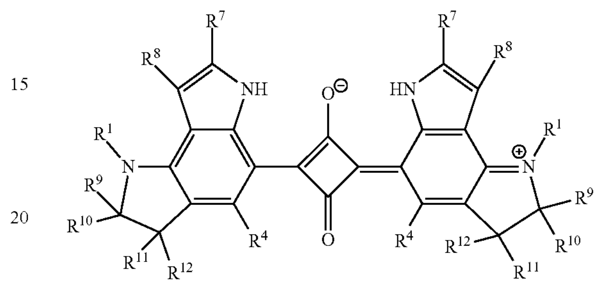

In the formulae (II-1) and (II-2), $R^1$ and $R^2$ each independently represent a hydrogen atom, a halogen atom, or an alkyl group having 1 to 15 carbon atoms which may have a substituent, and $R^3$ to $R^6$ each independently represent a hydrogen atom, a halogen atom, or an alkyl group having 1 to 10 carbon atoms which may have a substituent.

In the formula (II-3), $R^1$, $R^4$, and $R^9$ to $R^{12}$ each independently represent a hydrogen atom, a halogen atom, or an alkyl group having 1 to 15 carbon atoms which may have a substituent, and $R^7$ and $R^8$ each independently represent a hydrogen atom, a halogen atom, or an alkyl group having 1 to 5 carbon atoms which may have a substituent.

Regarding $R^1$ and $R^2$ in the compound (II-1) and the compound (II-2), from the viewpoint of solubility in a resin, visible light transmittance, and the like, it is preferable that $R^1$ and $R^2$ be independently alkyl groups having 1 to 15 carbon atoms, it is more preferable that $R^1$ and $R^2$ be alkyl groups having 7 to 15 carbon atoms, it is further preferably at least one of $R^1$ and $R^2$ be an alkyl group having a branched chain having 7 to 15 carbon atoms, and it is particularly preferable that both $R^1$ and $R^2$ be alkyl groups having a branched chain and having 8 to 15 carbon atoms.

$R^1$ in the compound (II-3) is independently preferably an alkyl group having 1 to 15 carbon atoms, more preferably an alkyl group having 1 to 10 carbon atoms, and particularly preferably an ethyl group or an isopropyl group, from the viewpoint of solubility in a transparent resin, visible light transmittance, and the like.

$R^4$ is preferably a hydrogen atom or a halogen atom, and particularly preferably a hydrogen atom, from the viewpoint of visible light transmittance and ease of synthesis.

$R^7$ and $R^8$ are independently preferably a hydrogen atom, a halogen atom, or an alkyl group having 1 to 5 carbon atoms which may be substituted with a halogen atom, and more preferably a hydrogen atom, a halogen atom, or a methyl group.

$R^9$ to $R^{12}$ are independently preferably a hydrogen atom, a halogen atom, or an alkyl group having 1 to 5 carbon atoms which may be substituted with a halogen atom.

Examples of $—CR^9R^{10}—CR^{11}R^{12}—$ include divalent organic groups represented by the following groups (13-1) to (13-5).

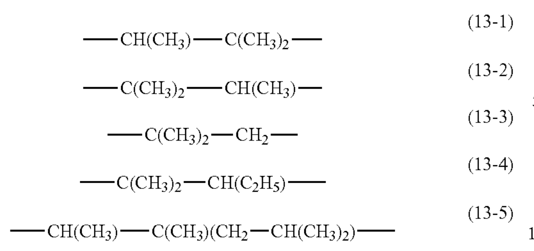

$$—CH(CH_3)—C(CH_3)_2— \quad (13\text{-}1)$$

$$—C(CH_3)_2—CH(CH_3)— \quad (13\text{-}2)$$

$$—C(CH_3)_2—CH_2— \quad (13\text{-}3)$$

$$—C(CH_3)_2—CH(C_2H_5)— \quad (13\text{-}4)$$

$$—CH(CH_3)—C(CH_3)(CH_2—CH(CH_3)_2)— \quad (13\text{-}5)$$

More specific examples of the compound (II-3) include compounds shown in the following table. In addition, in the compounds shown in the following table, meanings of respective symbols are the same on the left and right sides of a squarylium skeleton.

TABLE 2

| Pigment | Substituent | | | | | | | |
|---|---|---|---|---|---|---|---|---|
| abbreviation | $R^1$ | $R^4$ | $R^7$ | $R^8$ | $R^9$ | $R^{10}$ | $R^{11}$ | $R^{12}$ |
| (II-3-1) | $—CH_3$ | H | H | H | $—CH_3$ | H | $—CH_3$ | $—CH_2—C(CH_3)_2$ |
| (II-3-2) | $—C_2II_5$ | II | II | II | $—CII_3$ | II | $—CII_3$ | $—CII_2—C(II_3)_2$ |
| (II-3-3) | $—nC_3H_7$ | H | H | H | $—CH_3$ | H | $—CH_3$ | $—CH_2—C(CH_3)_2$ |
| (II-3-4) | $—CH(CH_3)_2$ | H | H | H | $—CH_3$ | H | $—CH_3$ | $—CH_2—C(CH_3)_2$ |
| (II-3-5) | $—CH_3$ | H | H | H | $—CH_3$ | H | $—CH_3$ | $—CH_3$ |
| (II-3-6) | $—C_2H_5$ | H | H | H | $—CH_3$ | H | $—CH_3$ | $—CH_3$ |
| (II-3-7) | $—nC_3H_7$ | H | H | H | $—CH_3$ | H | $—CH_3$ | $—CH_3$ |
| (II-3-8) | $—CH(CH_3)_2$ | H | H | H | $—CH_3$ | H | $—CH_3$ | $—CH_3$ |
| (II-3-9) | $—CH_3$ | H | H | H | $—CH_3$ | H | $—CH_3$ | $—C_2H_5$ |
| (II-3-10) | $—C_2II_5$ | II | II | II | $—CII_3$ | II | $—CII_3$ | $—C_2II_5$ |
| (II-3-11) | $—nC_3H_7$ | H | H | H | $—CH_3$ | H | $—CH_3$ | $—C_2H_5$ |
| (II-3-12) | $—CH(CH_3)_2$ | H | H | H | $—CH_3$ | H | $—CH_3$ | $—C_2H_5$ |
| (II-3-13) | $—CH_3$ | H | H | H | $—CH_3$ | H | $—CH_3$ | $—nC_3H_7$ |
| (II-3-14) | $—C_2H_5$ | H | H | H | $—CH_3$ | H | $—CH_3$ | $—nC_3H_7$ |
| (II-3-15) | $—nC_3H_7$ | H | H | H | $—CH_3$ | H | $—CH_3$ | $—nC_3H_7$ |
| (II-3-16) | $—CH(CH_3)_2$ | H | H | H | $—CH_3$ | H | $—CH_3$ | $—nC_3H_7$ |

The compound (II-3) is, among these compounds, preferably compounds (II-3-1) to (II-3-4) from the viewpoint of solubility in a resin, high absorption coefficient, light resistance, and heat resistance.

The compounds (I) and (II) can each be produced by known methods. The compound (I) can be produced by methods disclosed in U.S. Pat. No. 5,543,086, U.S. Patent Application Publication No. 2014/0061505, and WO2014/088063. The compound (II) can be produced by a method disclosed in WO2017/135359.

<NIR2: Cyanine Compound>

The cyanine compound as the pigment (NIR2) is preferably a compound represented by the following formula (III).

(III)

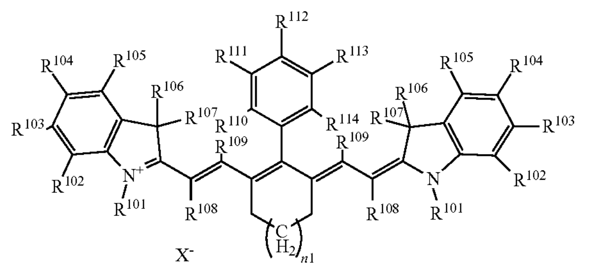

Here, symbols in the above-mentioned formula are as follows.

$R^{101}$ to $R^{109}$ each independently represent a hydrogen atom, a halogen atom, an alkyl group having 1 to 15 carbon atoms which may have a substituent, or an aryl group having 5 to 20 carbon atoms. $R^{110}$ to $R^{114}$ each independently represent a hydrogen atom, a halogen atom, or an alkyl group having 1 to 15 carbon atoms.

$X^-$ represents a monovalent anion.

Symbol n1 is 0 or 1. A hydrogen atom bonded to a carbon ring containing $—(CH_2)_{n1}—$ may be substituted with a halogen atom, an alkyl group having 1 to 15 carbon atoms or an aryl group having 5 to 20 carbon atoms which may have a substituent.

In the above description, the alkyl group (including the alkyl group of the alkoxy group) may be a linear chain, or may have a branched structure or a saturated ring structure. The aryl group refers to a group bonded via a carbon atom constituting an aromatic ring of an aromatic compound, for example, a benzene ring, a naphthalene ring, a biphenyl, a furan ring, a thiophene ring, a pyrrole ring, or the like. Examples of the substituent in the alkyl group or alkoxy group having 1 to 15 carbon atoms which may have a substituent, and the aryl group having 5 to 20 carbon atoms include a halogen atom and an alkoxy group having 1 to 10 carbon atoms.

In the formula (III), $R^{101}$ is preferably an alkyl group having 1 to 15 carbon atoms or an aryl group having 5 to 20 carbon atoms, and more preferably a branched alkyl group having 1 to 15 carbon atoms from the viewpoint of maintaining high visible light transmittance in the resin.

In the formula (III), $R^{102}$ to $R^{105}$, $R^{108}$, and $R^{109}$ are each independently preferably a hydrogen atom, an alkyl group or an alkoxy group having 1 to 15 carbon atoms, or an aryl group having 5 to 20 carbon atoms, and more preferably a hydrogen atom from the viewpoint of obtaining high visible light transmittance.

In the formula (III), $R^{110}$ to $R^{114}$ are each independently preferably a hydrogen atom or an alkyl group having 1 to 15 carbon atoms, and more preferably a hydrogen atom from the viewpoint of obtaining high visible light transmittance.

$R^{106}$ and $R^{107}$ are each independently preferably a hydrogen atom, an alkyl group having 1 to 15 carbon atoms, or an aryl group having 5 to 20 carbon atoms (which may include a chain-like, cyclic, or branched alkyl group), and more preferably a hydrogen atom, or an alkyl group having 1 to 15 carbon atoms. In addition, $R^{106}$ and R 107 are preferably the same group.

Examples of $X^-$ include $I^-$, $BF_4^-$, $PF_6^-$, $ClO_4^-$, and anions represented by formulae (X1) and (X2), and preferably $BF_4^-$ or $PF_6^-$.

(X1)

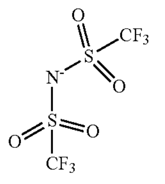

(X2)

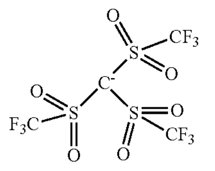

In the following description, a portion of the pigment (III) excluding $R^{101}$ to $R^{114}$ is also referred to as a skeleton (III).

In the formula (III), a compound in which n1 is 1 is shown in the following formula (III-1), and a compound in which n1 is 0 is shown in the following formula (III-2).

(III-1)

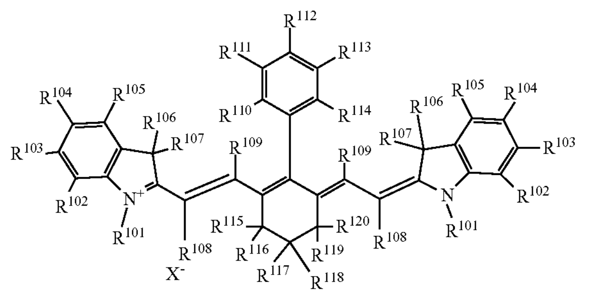

-continued (III-2)

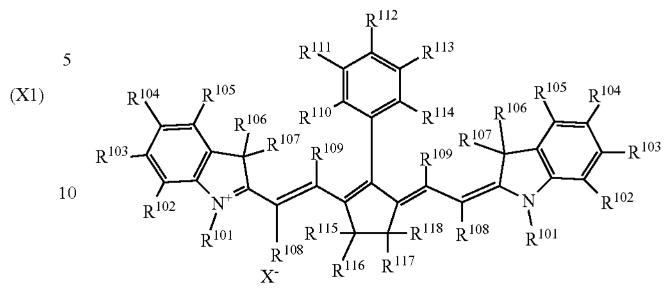

In the formula (III-1) and the formula (III-2), $R^{101}$ to $R^{114}$ and $X^-$ are the same as those in the formula (III). $R^{115}$ to $R^{120}$ each independently represents a hydrogen atom, a halogen atom, an alkyl group or an alkoxy group having 1 to 15 carbon atoms which may have a substituent, or an aryl group having 5 to 20 carbon atoms. $R^{115}$ to $R^{120}$ are each independently preferably a hydrogen atom, an alkyl group having 1 to 15 carbon atoms, or an aryl group having 5 to 20 carbon atoms (which may include a chain-like, cyclic, or branched alkyl group), and more preferably a hydrogen atom, or an alkyl group having 1 to 15 carbon atoms. In addition, $R^{115}$ to $R^{120}$ are preferably the same group.

More specifically, examples of the compound represented by the formula (III-1) or the formula (III-2) include a compound in which an atom or a group bonded to each skeleton is an atom or a group shown in the following table. In all the compounds shown in the following table, $R^{101}$ to $R^{109}$ are all the same on the left and right sides of the formulae.

$R^{110}$ to $R^{114}$ in the following table represent an atom or a group bonded to a benzene ring at the center of each formula, and are described as "H" when all of the five are hydrogen atoms. In a case where any of $R^{110}$ to $R^{114}$ is a substituent and the others are hydrogen atoms, only a combination of a symbol representing the substituent and the substituent is described. For example, the description of "$R^{112}$—$C(CH_3)_3$" indicates that $R^{112}$ represents —$C(CH_3)_3$ and the others are hydrogen atoms.

In the following table, $R^{115}$ to $R^{120}$ each represent an atom or a group bonded to a center cyclohexane ring in the formula (III-1), and are described as "H" when all the six are hydrogen atoms. In a case where any of $R^{115}$ to $R^{120}$ is a substituent and the others are hydrogen atoms, only a combination of a symbol representing the substituent and the substituent is described.

TABLE 3

| Pigment | Substituent | | | | | | | | |
|---|---|---|---|---|---|---|---|---|---|
| abbreviation | $R^{101}$ | $R^{102}$ to $R^{105}$ | $R^{106}$ | $R^{107}$ | $R^{108}$ | $R^{109}$ | $R^{110}$ to $R^{114}$ | $R^{115}$ to $R^{120}$ | $X^-$ |
| (III-1-1) | —$CH_3$ | H | —$CH_3$ | —$CH_3$ | H | H | H | H | $BF_4$- |
| (III-1-2) | —$C_2H_5$ | H | —$CH_3$ | —$CH_3$ | H | H | H | H | $BF_4$- |
| (III-1-3) | —$nC_3H_7$ | H | —$CH_3$ | —$CH_3$ | H | H | H | H | $BF_4$- |
| (III-1-4) | —$CH(CH_3)_2$ | H | —$CH_3$ | —$CH_3$ | H | H | H | H | $BF_4$- |
| (III-1-5) | —$CH_3$ | H | —$CH_3$ | —$CH_3$ | H | H | H | H | $PF_6$- |
| (III-1-6) | —$C_2H_5$ | H | —$CH_3$ | —$CH_3$ | H | H | H | H | $PF_6$- |
| (III-1-7) | —$nC_3H_7$ | H | —$CH_3$ | —$CH_3$ | H | H | H | H | $PF_6$- |
| (III-1-8) | —$CH(CH_3)_2$ | H | —$CH_3$ | —$CH_3$ | H | H | H | H | $PF_6$- |
| (III-1-9) | —$CH_3$ | H | —$CH_3$ | —$CH_3$ | H | H | H | H | $N(SO_2CF_3)_2$- |
| (III-1-10) | —$C_2H_5$ | H | —$CH_3$ | —$CH_3$ | H | H | H | H | $N(SO_2CF_3)_2$- |
| (III-1-11) | —$nC_3H_7$ | H | —$CH_3$ | —$CH_3$ | H | H | H | H | $N(SO_2CF_3)_2$- |
| (III-1-12) | —$CH(CH_3)_2$ | H | —$CH_3$ | —$CH_3$ | H | H | H | H | $N(SO_2CF_3)_2$- |
| (III-1-13) | —$CH_3$ | H | —$CH_3$ | —$CH_3$ | H | H | H | H | $ClO_4$- |
| (III-1-14) | —$C_2H_3$ | H | —$CH_3$ | —$CH_3$ | H | H | H | H | $ClO_4$- |
| (III-1-15) | —$nC_3H_7$ | H | —$CH_3$ | —$CH_3$ | H | H | H | H | $ClO_4$- |

TABLE 3-continued

| Pigment | Substituent | | | | | | | |
|---|---|---|---|---|---|---|---|---|
| abbreviation | $R^{101}$ | $R^{102}$ to $R^{105}$ | $R^{106}$ | $R^{107}$ | $R^{108}$ | $R^{109}$ | $R^{110}$ to $R^{114}$ | $R^{115}$ to $R^{120}$ | $X^-$ |
| (III-1-16) | $—CH(CH_3)_2$ | H | $—CH_3$ | $—CH_3$ | H | H | H | H | $ClO_4$- |
| (III-1-17) | $—CH_3$ | H | H | H | H | H | H | H | $BF_4$- |
| (III-1-18) | $—C_2H_5$ | H | H | H | H | H | H | H | $BF_4$- |
| (III-1-19) | $—nC_3H_7$ | H | H | H | H | H | H | H | $BF_4$- |
| (III-1-20) | $—CH(CH_3)_2$ | H | H | H | H | H | H | H | $BF_4$- |
| (III-1-21) | $—CH_3$ | H | H | H | H | H | H | H | $PF_6$- |
| (III-1-22) | $—C_2H_5$ | H | H | H | H | H | H | H | $PF_6$- |
| (III-1-23) | $—nC_3H_7$ | H | H | H | H | H | H | H | $PF_6$- |
| (III-1-24) | $—CH(CH_3)_2$ | H | H | H | H | H | H | H | $PF_6$- |
| (III-1-25) | $—CH_3$ | H | H | H | H | H | H | H | $N(SO_2CF_3)_2$- |
| (III-1-26) | $—C_2H_5$ | H | H | H | H | H | H | H | $N(SO_2CF_3)_2$- |
| (III-1-27) | $—nC_3H_7$ | H | H | H | H | H | H | H | $N(SO_2CF_3)_2$- |
| (III-1-28) | $—CH(CH_3)_2$ | H | H | H | H | H | H | H | $N(SO_2CF_3)_2$- |
| (III-1-29) | $—CH_3$ | H | H | H | H | H | H | H | $ClO_4$- |
| (III-1-30) | $—C_2H_5$ | H | H | H | H | H | H | H | $ClO_4$- |
| (III-1-31) | $—nC_3II_7$ | II | II | II | II | II | II | II | $ClO_4$- |
| (III-1-32) | $—CH(CH_3)_2$ | H | H | H | H | H | H | H | $ClO_4$- |

As the pigment (III-1), among these compounds, pigments (III-1-1) to (III-1-12) and the like are preferable from the viewpoint of transmittance in the visible light region, solubility in a resin, heat resistance, and light resistance. In particular, pigments (III-1-1), (III-1-5), and (III-1-9) are particularly preferable in terms of ease of synthesis.

The pigment (III) can be produced, for example, by methods described in Dyes and Pigments 73(2007)344-352 and J. Heterocyclic chem, 42,959(2005).

A content of a NIR pigment in the resin film is preferably 0.1 parts by mass to 25 parts by mass, and more preferably 0.3 parts by mass to 15 parts by mass with respect to 100 parts by mass of the resin. In a case where two or more compounds are combined, the above-mentioned content is a sum of respective compounds.

In addition, in a case where the pigment (NIR1) and the pigment (NIR2) are used in combination, a content of the pigment (NIR1) is preferably 0.1 parts by mass to 10 parts by mass with respect to 100 parts by mass of the resin, and a content of the pigment (NIR2) is preferably 0.1 parts by mass to 10 parts by mass with respect to 100 parts by mass of the resin.

<UV Pigment>

The resin film may contain other pigments in addition to the above-mentioned NIR pigment. As the other pigments, a pigment (UV) having a maximum absorption wavelength in 370 nm to 440 nm in the resin is preferable. Accordingly, the near ultraviolet region can be efficiently shielded.

Examples of the pigment (UV) include an oxazole pigment, a merocyanine pigment, a cyanine pigment, a naphthalimide pigment, an oxadiazole pigment, an oxazine pigment, an oxazolidine pigment, a naphthalic acid pigment, a styryl pigment, an anthracene pigment, a cyclic carbonyl pigment, and a triazole pigment. Among those, the merocyanine pigment is particularly preferable. In addition, these pigments may be used alone, or may be used in combination of two or more types thereof.

The pigment (UV) is particularly preferably a merocyanine pigment represented by the following formula (M).

(M)

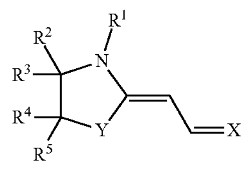

Symbols in the formula (M) are as follows.

$R^1$ represents a monovalent hydrocarbon group having 1 to 12 carbon atoms which may have a substituent.

The substituent is preferably an alkoxy group, an acyl group, an acyloxy group, a cyano group, a dialkylamino group, or a chlorine atom. The above-mentioned alkoxy group, acyl group, acyloxy group and dialkylamino group preferably have 1 to 6 carbon atoms.

Specifically, $R^1$ which does not have a substituent is preferably an alkyl group having 1 to 12 carbon atoms in which a part of hydrogen atoms may be substituted with an aliphatic ring, an aromatic ring or an alkenyl group, a cycloalkyl group having 3 to 8 carbon atoms in which a part of hydrogen atoms may be substituted with an aromatic ring, an alkyl group or an alkenyl group, or an aryl group having 6 to 12 carbon atoms in which a part of hydrogen atoms may be substituted with an aliphatic ring, an alkyl group or an alkenyl group.

In a case where $R^1$ is an unsubstituted alkyl group, the alkyl group may be linear or branched, and the number of carbon atoms thereof is more preferably 1 to 6.

In a case where $R^1$ is an alkyl group having 1 to 12 carbon atoms in which a part of hydrogen atoms is substituted with an aliphatic ring, an aromatic ring or an alkenyl group, an alkyl group having 1 to 4 carbon atoms and having a cycloalkyl group having 3 to 6 carbon atoms or an alkyl group having 1 to 4 carbon atoms substituted with a phenyl group is more preferable, and an alkyl group having 1 carbon atom or 2 carbon atoms substituted with a phenyl group is particularly preferable. The alkyl group substituted with an alkenyl group refers to an alkenyl group as a whole but does not have an unsaturated bond between the 1-position and the 2-position, for example, an allyl group, a 3-butenyl group, and the like.

Preferred $R^1$ is an alkyl group having 1 to 6 carbon atoms in which a part of hydrogen atoms may be substituted with a cycloalkyl group or a phenyl group. Particularly preferred $R^1$ is an alkyl group having 1 to 6 carbon atoms, and specific examples thereof include a methyl group, an ethyl group, an n-propyl group, an isopropyl group, an n-butyl group, an isobutyl group, and a t-butyl group.

$R^2$ to $R^5$ each independently represent a hydrogen atom, a halogen atom, an alkyl group having 1 to 10 carbon atoms, or an alkoxy group having 1 to 10 carbon atoms. The alkyl group and the alkoxy group preferably have 1 to 6 carbon atoms, and more preferably 1 to 4 carbon atoms.

At least one of $R^2$ and $R^3$ is preferably an alkyl group, and both are more preferably alkyl groups. In a case where $R^2$ and $R^3$ are not alkyl groups, the two are more preferably hydrogen atoms. Both $R^2$ and $R^3$ are particularly preferably alkyl groups having 1 to 6 carbon atoms.

At least one of $R^4$ and $R^5$ is preferably a hydrogen atom, and both are more preferably hydrogen atoms. In a case where $R^4$ or $R^5$ is not a hydrogen atom, an alkyl group having 1 to 6 carbon atoms is preferable.

Y represents a methylene group or an oxygen atom substituted with $R^6$ and $R^7$.

$R^6$ and $R^7$ each independently represent a hydrogen atom, a halogen atom, an alkyl group having 1 to 10 carbon atoms, or an alkoxy group having 1 to 10 carbon atoms.

X represents any of divalent groups represented by the following formulae (X1) to (X5).

(X1)

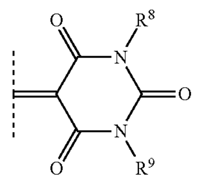

(X2)

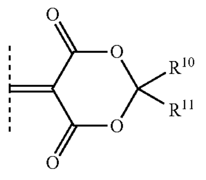

(X3)

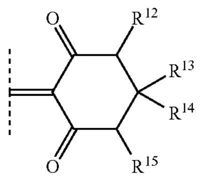

(X4)

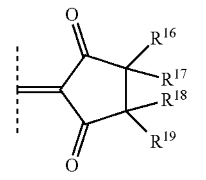

(X5)

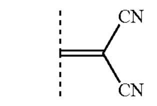

$R^8$ and $R^9$ each independently represent a monovalent hydrocarbon group having 1 to 12 carbon atoms which may have a substituent, and $R^{10}$ to $R^{19}$ each independently represent a hydrogen atom or a monovalent hydrocarbon group having 1 to 12 carbon atoms which may have a substituent.

Examples of the substituents of $R^8$ to $R^{19}$ include the same substituents as the substituent of $R^1$, and preferred embodiments thereof are also the same. In a case where $R^8$ to $R^{19}$ are hydrocarbon groups which do not have a substituent, examples thereof include the same aspects as those of $R^1$ which does not have a substituent.

In the formula (X1), $R^8$ and $R^9$ may be different groups, but are preferably the same group. In a case where $R^8$ and $R^9$ represent unsubstituted alkyl groups, the alkyl groups may be linear or branched, and the number of carbon atoms thereof is more preferably 1 to 6.

Preferred $R^8$ and $R^9$ are both alkyl groups having 1 to 6 carbon atoms in which a part of hydrogen atoms may be substituted with a cycloalkyl group or a phenyl group. Particularly preferred $R^8$ and $R^9$ both represent alkyl groups having 1 to 6 carbon atoms, and specific examples thereof include a methyl group, an ethyl group, an n-propyl group, an isopropyl group, an n-butyl group, an isobutyl group, and a t-butyl group.

In the formula (X2), both $R^{10}$ and $R^{11}$ are more preferably alkyl groups having 1 to 6 carbon atoms, and particularly preferably the same alkyl group.

In the formula (X3), both $R^{12}$ and $R^{15}$ are preferably hydrogen atoms or alkyl groups having 1 to 6 carbon atoms which do not have a substituent. Both $R^{13}$ and $R^{14}$, which are two groups bonded to the same carbon atom, are preferably hydrogen atoms or alkyl groups having 1 to 6 carbon atoms.

All of $R^{16}$ and $R^{17}$ as well as $R^{18}$ and $R^{19}$ in the formula (X4), which are two groups bonded to the same carbon atom, are preferably hydrogen atoms or alkyl groups having 1 to 6 carbon atoms.

The compound (M) can be produced by a known method.

A content of the pigment (UV) in the resin film is preferably 0.1 parts by mass to 15 parts by mass, and more preferably 1 parts by mass to 10 parts by mass with respect to 100 parts by mass of the resin. Within such a range, reduction in resin characteristics is unlikely to occur.

<Configuration of Substrate>

The substrate in the filter is a composite substrate in which a resin film is laid on or above at least one major surface of the near infrared ray absorbing glass.

The resin is not limited as long as it is a transparent resin, and one or more kinds of transparent resins selected from a polyester resin, an acrylic resin, an epoxy resin, an ene-thiol resin, a polycarbonate resin, a polyether resin, a polyarylate resin, a polysulfone resin, a polyethersulfone resin, a poly (p-phenylene) resin, a polyarylene ether phosphine oxide resin, a polyamide resin, a polyimide resin, a polyamide-imide resin, a polyolefin resin, a cyclic olefin resin, a polyurethane resin, a polystyrene resin, and the like are used. These resins may be used alone, or may be used by mixing two or more kinds thereof.

From the viewpoint of spectral characteristics, glass transition point (Tg), and adhesion of the resin film, one or more kinds of resins selected from a polyimide resin, a polycarbonate resin, a polyester resin, and an acrylic resin are preferable.

In a case where a plurality of compounds are used as the NIR pigment or other pigments, those compounds may be included in the same resin film or may be included in different resin films.

The resin film can be formed by dissolving or dispersing a pigment, a resin or raw material components of the resin, and respective components blended as necessary in a solvent to prepare a coating solution, applying the coating solution to a support, drying the coating solution, and further curing the coating solution as necessary. The support in this case may be the near infrared ray absorbing glass used for the filter, or may be a peelable support used only when the resin film is to be formed. In addition, the solvent may be a dispersion medium capable of stably dispersing or a solvent capable of dissolving.

In addition, the coating solution may contain a surfactant in order to improve voids due to fine bubbles, depressions due to adhesion of foreign substances and the like, and repelling in a drying process. Further, for the application of the coating solution, for example, a dip coating method, a cast coating method, or a spin coating method can be used. The above-mentioned coating solution is applied onto the support and then dried to form a resin film. In addition, in a case where the coating solution contains a raw material component of the transparent resin, a curing process such as thermal curing or photocuring is further performed.

The resin film can also be produced into a film shape by extrusion molding. The substrate can be produced by laminating the obtained film-shaped resin film on the near infrared ray absorbing glass and integrating the laid film by thermal press fitting or the like.

The resin film may be provided in the optical filter by one layer or two or more layers. In a case where the resin film is provided by two or more layers, respective layers may have the same configuration or different configurations.

A thickness of the resin film is 10 μm or less and preferably 5 μm or less from the viewpoint of in-plane film thickness distribution and appearance quality in a substrate after coating, and is preferably 0.5 μm or more from the viewpoint of exhibiting desired spectral characteristics at an appropriate pigment concentration. In the case where the optical filter has two or more layers of resin films, a total thickness of the respective resin films is preferably within the above-mentioned range.

A shape of the substrate is not particularly limited, and may be a block shape, a plate shape, or a film shape.

The filter may include, as another component, for example, a component (layer) that provides absorption by inorganic fine particles or the like that control transmission and absorption of light in a specific wavelength region. Specific examples of the inorganic fine particles include indium tin oxides (ITO), antimony-doped tin oxides (ATO), cesium tungstate, and lanthanum boride. The ITO fine particles and the cesium tungstate fine particles have high visible light transmittance and have light absorbing property in a wide range of an infrared wavelength region exceeding 1,200 nm, and thus can be used in a case where shielding property of infrared light is required.

As described above, the present description discloses the following optical filters and the like.

[1] An optical filter including:

a substrate, and a dielectric multilayer film laid on or above at least one major surface of the substrate as an outermost layer, in which the substrate includes a near infrared ray absorbing glass and a resin film, the resin film is laid on or above at least one major surface of the near infrared ray absorbing glass and has a thickness of 10 μm or less, the resin film includes a resin and a pigment (NIR1) having a maximum absorption wavelength in 680 nm to 740 nm in the resin, and the optical filter satisfies all of the following spectral characteristics (i-1) to (i-13):

(i-1) in a spectral transmittance curve at an incident angle of 0 degrees, an average transmittance $T_{450\text{-}600(0deg)AVE}$ at a wavelength of 450 nm to 600 nm is 80% or more, (i-2) in a spectral transmittance curve at an incident angle of 50 degrees, an average transmittance $T_{450\text{-}600(50deg)AVE}$ at the wavelength of 450 nm to 600 nm is 80% or more, (i-3) an absolute value of a difference between the average transmittance $T_{450\text{-}600(0deg)AVE}$ and the average transmittance $T_{450\text{-}600(50deg)AVE}$ is 5% or less, (i-4) in the spectral transmittance curve at an incident angle of 0 degrees, a transmittance $T_{450(0deg)}$ at a wavelength of 450 nm is 80% or more, (i-5) in the spectral transmittance curve at an incident angle of 50 degrees, a transmittance $T_{450(50deg)}$ at the wavelength of 450 nm is 80% or more, (i-6) in the spectral transmittance curve at an incident angle of 0 degrees, a maximum transmittance $T_{450\text{-}600(0deg)MAX}$ at the wavelength of 450 nm to 600 nm is 90% or more, (i-7) in the spectral transmittance curve at an incident angle of 0 degrees, a wavelength $IR50_{(0deg)}$ at which a transmittance is 50% is in a range of 610 nm to 650 nm, (i-8) in the spectral transmittance curve at an incident angle of 50 degrees, a wavelength $IR50_{(50deg)}$ at which a transmittance is 50% is in the range of 610 nm to 650 nm, (i-9) an absolute value of a difference between the wavelength $IR50_{(0deg)}$ and the wavelength $IR50_{(50deg)}$ is 10 nm or less, (i-10) in the spectral transmittance curve at an incident angle of 0 degrees, a maximum transmittance $T_{1000\text{-}1200(0deg)MAX}$ at a wavelength of 1,000 nm to 1,200 nm is 5% or less, (i-11) in the spectral transmittance curve at an incident angle of 50 degrees, a maximum transmittance $T_{1000\text{-}1200(50deg)MAX}$ at the wavelength of 1,000 nm to 1,200 nm is 5% or less, (i-12) the transmittance $T_{450(0deg)}$/the maximum transmittance $T_{1000\text{-}1200(0deg)MAX} \geq 25$, and (i-13) the transmittance $T_{450(50deg)}$/the maximum transmittance $T_{1000\text{-}1200(50deg)MAX} \geq 10$.

[2] The optical filter according to [1], further satisfying the following spectral characteristics (i-14) and (i-15):

(i-14) in the spectral transmittance curve at an incident angle of 0 degrees, a maximum transmittance $T_{750\text{-}1000(0deg)MAX}$ at a wavelength of 750 nm to 1,000 nm is 1% or less, and (i-15) in the spectral transmittance curve at an incident angle of 50 degrees, a maximum transmittance $T_{750\text{-}1000(50deg)MAX}$ at the wavelength of 750 nm to 1,000 nm is 1% or less.

[3] The optical filter according to [1] or [2], in which the substrate satisfies all of the following spectral characteristics (ii-1) to (ii-7):

(ii-1) an average internal transmittance $T_{450\text{-}600AVE}$ at the wavelength of 450 nm to 600 nm is 85% or more, (ii-2) a maximum internal transmittance $T_{450\text{-}600MAX}$ at the wavelength of 450 nm to 600 nm is 92% or more.

(ii-3) an internal transmittance $T_{450}$ at the wavelength of 450 nm is 82% or more, (ii-4) a wavelength IR50 at which the internal transmittance is 50% is in a range of 610 nm to 650 nm, (ii-5) an average internal transmittance $T_{750\text{-}1000AVE}$ at a wavelength of 750 nm to 1,000 nm is 1.5% or less, (ii-6) a maximum internal transmittance $T_{1000\text{-}1200MAX}$ at the wavelength of 1,000 nm to 1,200 nm is 5% or less, and (ii-7) the internal transmittance $T_{450}$/the maximum internal transmittance $T_{1000\text{-}1200MAX}$≥15.

[4] The optical filter according to any of [1] to [3], in which the substrate further satisfies the following spectral characteristic (ii-8):

(ii-8) a maximum internal transmittance $T_{750\text{-}1000MAX}$ at a wavelength of 750 nm to 1,000 nm is 2% or less.

[5] The optical filter according to any of [1] to [4], in which the near infrared ray absorbing glass satisfies all of the following spectral characteristics (iii-1) to (iii-6):

(iii-1) an average internal transmittance $T_{450\text{-}600AVE}$ at the wavelength of 450 nm to 600 nm is 90% or more, (iii-2) an internal transmittance $T_{450}$ at the wavelength of 450 nm is 92% or more, (iii-3) a wavelength IR50 at which an internal transmittance is 50% is in a range of 625 nm to 650 nm, (iii-4) an average internal transmittance $T_{750\text{-}1000AVE}$ at a wavelength of 750 nm to 1,000 nm is 2.5% or less.

(iii-5) a maximum internal transmittance $T_{1000\text{-}1200MAX}$ at the wavelength of 1,000 nm to 1,200 nm is 5% or less, and (iii-6) the internal transmittance Taso/the maximum internal transmittance $T_{1000\text{-}1200MAX}$≥10.

[6] The optical filter according to any of [1] to [5], in which the resin film satisfies all of the following spectral characteristics (iv-1) to (iv-5):

(iv-1) an average internal transmittance $T_{450\text{-}600AVE}$ at the wavelength of 450 nm to 600 nm is 93% or more, (iv-2) a maximum internal transmittance $T_{450\text{-}600MAX}$ at the wavelength of 450 nm to 600 nm is 95% or more, (iv-3) an internal transmittance $T_{450}$ at the wavelength of 450 nm is 86% or more, (iv-4) $IR50_{(L)}-IR50_{(S)}$≥90 nm where $IR50_{(S)}$ is a shortest wavelength and $IR50_{(L)}$ is a longest wavelength at which an internal transmittance is 50% in a spectral transmittance curve at a wavelength of 650 nm to 900 nm, and (iv-5) a minimum internal transmittance $T_{700\text{-}800MIN}$ at a wavelength of 700 nm to 800 nm is 10% or less.

[7] The optical filter according to any of [1] to [6], in which the resin film further includes a pigment (NIR2), and the pigment (NIR2) has a maximum absorption wavelength in the resin longer than a maximum absorption wavelength of the pigment (NIR1) in the resin by 20 nm to 60 nm.

[8] The optical filter according to any of [1] to [7], in which the dielectric multilayer film satisfies all of the following spectral characteristics (v-1) to (v-5):

(v-1) in a spectral transmittance curve at an incident angle of 0 degrees, a minimum transmittance $T_{450\text{-}600(0deg)MIN}$ at the wavelength of 450 nm to 600 nm is 90% or more, (v-2) in a spectral transmittance curve at an incident angle of 50 degrees, a minimum transmittance $T_{450\text{-}600(50deg)MIN}$ at the wavelength of 450 nm to 600 nm is 90% or more, (v-3) an absolute value of a difference between the minimum transmittance $T_{450\text{-}600(0deg)MIN}$ and the minimum transmittance $T_{450\text{-}600(50deg)MIN}$ is 5% or less, (v-4) in the spectral transmittance curve at an incident angle of 0 degrees, an average transmittance $T_{700\text{-}1200(0deg)AVE}$ at a wavelength of 700 nm to 1,200 nm is 30% to 75%, and (v-5) in the spectral transmittance curve at an incident angle of 50 degrees, an average transmittance $T_{700\text{-}1200(50deg)AVE}$ at the wavelength of 700 nm to 1,200 nm is 30% to 75%.

[9] The optical filter according to any of [1] to [8], in which the dielectric multilayer film includes a dielectric thin film having a refractive index of 1.6 to 2.1.

[10] The optical filter according to any of [1] to [9], in which the resin film includes a squarylium compound as the pigment (NIR1) having the maximum absorption wavelength in 680 nm to 740 nm in the resin, and the resin film further includes at least one of a squarylium compound and a cyanine compound as a pigment (NIR2) having a maximum absorption wavelength in the resin longer than the maximum absorption wavelength of the pigment (NIR1) in the resin by 20 nm to 60 nm.

[11] The optical filter according to any of [1] to [10], in which the resin film further includes a pigment (UV) having a maximum absorption wavelength in 370 nm to 440 nm in the resin.

[12] An imaging device including the optical filter according to any of [1] to [11].

EXAMPLES

Next, the present invention will be described more specifically with reference to examples.

For measurement of each spectral characteristic, an ultraviolet-visible spectrophotometer (UH-4150 type, manufactured by Hitachi High-Tech Corporation) was used.

The spectral characteristic in a case where an incident angle is not particularly specified is a value measured at an incident angle of 0 degrees (in a direction perpendicular to a major surface of an optical filter).

Pigments used in respective examples are as follows.

Compound 1 (squarylium compound): synthesized based on WO2014/088063 and WO2016/133099.

Compound 2 (merocyanine compound): synthesized based on the description of German Patent No. 10109243.

Compound 3 (squarylium compound): synthesized based on WO2017/135359.

Compound 4 (cyanine compound): synthesized based on a method described in Dyes and Pigments, 73, 344 to 352 (2007).

Compound 5 (cyanine compound): synthesized based on the method described in Dyes and Pigments, 73, 344 to 352 (2007).

Compound 6 (diimmonium compound): synthesized based on a method described in Japanese Patent No. 4800769.

COMPOUND 1

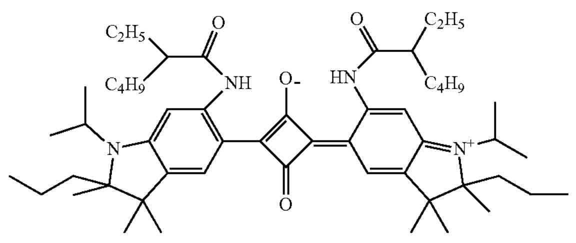

-continued

COMPOUND 2

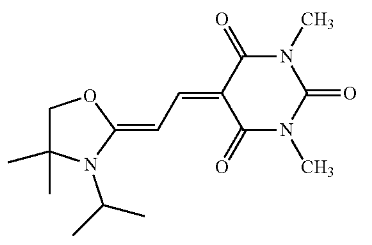

COMPOUND 3

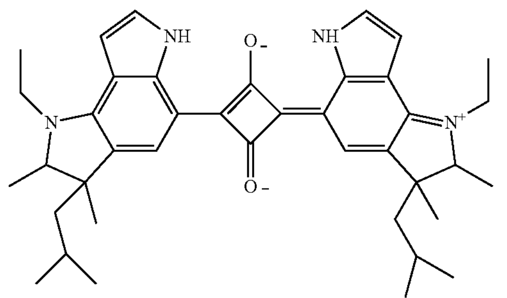

COMPOUND 4

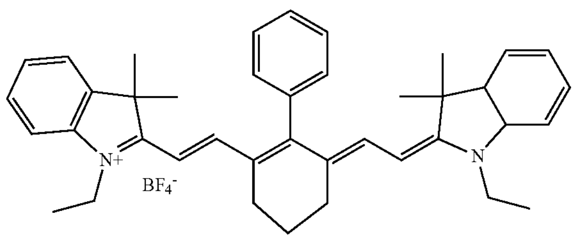

COMPOUND 5

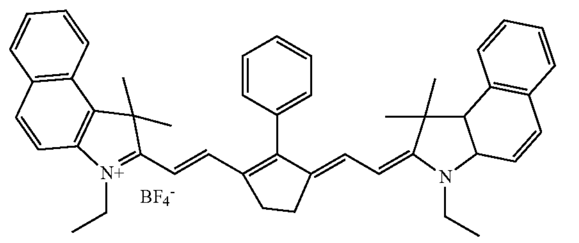

COMPOUND 6

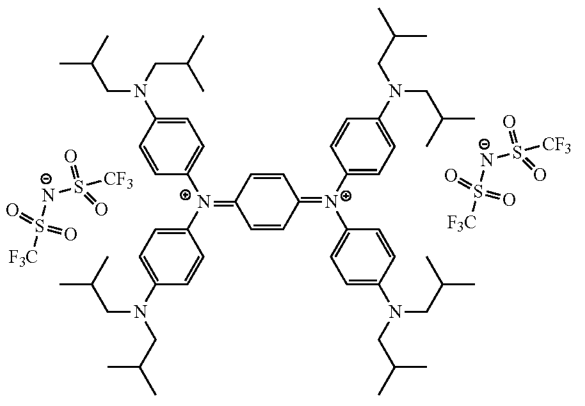

<Spectral Characteristics of Pigment in Resin>

A polyimide resin ("C3G30G" (trade name), manufactured by Mitsubishi Gas Chemical Company, Inc., refractive index: 1.59) was dissolved in a liquid of γ-butyrolactone (GBL):cyclohexanone=1:1 (mass ratio) to prepare a polyimide resin solution having a resin concentration of 8.5 mass %.

Each of the pigments of the above-mentioned respective compounds 1 to 6 was added to the resin solution at a concentration of 7.5 parts by mass with respect to 100 parts by mass of the resin, and stirred and dissolved at 50° C., for 2 hours to obtain a coating solution. Each of the obtained coating solutions was applied to an alkaline glass (D263 glass, manufactured by SCHOTT, thickness: 0.2 mm) by a spin coating method to form coating films having a thickness of about 1.0 μm.

With respect to each of the obtained coating films, a spectral transmittance curve in a wavelength range of 350 nm to 1,200 nm was measured using the ultraviolet-visible spectrophotometer.

The spectral characteristics in the polyimide resin of the above-mentioned respective compounds 1 to 6 are shown in the following table. The spectral characteristics shown in the following table were evaluated in terms of internal transmittance in order to avoid an influence of reflection at an air interface and a glass interface.

TABLE 4

| Pigment number | Maximum absorption wavelength in resin |
|---|---|
| Compound 1 | 722 nm |
| Compound 2 | 400 nm |
| Compound 3 | 752 nm |
| Compound 4 | 773 nm |
| Compound 5 | 845 nm |
| Compound 6 | 1,112 nm |

<Spectral Characteristics of Near Infrared Ray Absorbing Glass>

A phosphate glass (SP50T, manufactured by AGC) was prepared as the near infrared ray absorbing glass.

With respect to the near infrared ray absorbing glass, a spectral transmittance curve in the wavelength range of 350 nm to 1,200 nm was measured using the ultraviolet-visible spectrophotometer.

Based on the obtained data of the spectral characteristics, the following were calculated: an average internal transmittance $T_{450\text{-}600AVE}$ and a maximum internal transmittance $T_{450\text{-}600MAX}$ at a wavelength of 450 nm to 600 nm, an internal transmittance $T_{450}$ at a wavelength of 450 nm, a wavelength IR50 at which the internal transmittance is 50%, an average internal transmittance $T_{750\text{-}1000AVE}$ at a wavelength of 750 nm to 1,000 nm, a maximum internal transmittance $T_{1000\text{-}1200MAX}$ at a wavelength of 1,000 nm to 1,200 nm, and the internal transmittance $T_{450}$/the maximum internal transmittance $T_{1000\text{-}1200MAX}$.

Results are shown in the following table. The spectral characteristics shown in the following table were evaluated in terms of internal transmittance in order to avoid an influence of reflection at an air interface and a glass interface.

Figure 4:
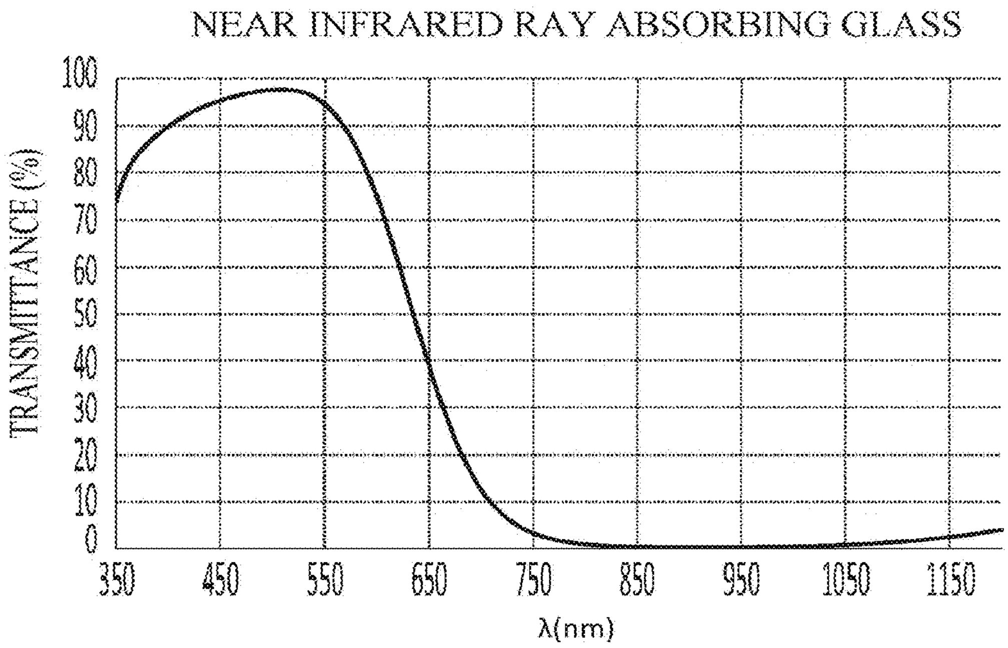
FIG. 4 is a diagram illustrating a spectral transmittance curve of a near infrared ray absorbing glass.

In addition, a spectral transmittance curve of the near infrared ray absorbing glass is illustrated in FIG. 4.

TABLE 5

| | Type | Phosphoric acid |
|---|---|---|
| Glass | Thickness (mm) | 0.28 |
| Spectral characteristics | T450-600 average internal transmittance (%) | 93.3 |
| | T450-600 maximum internal transmittance (%) | 97.6 |
| | T450 internal transmittance (%) | 95.3 |
| | IR50 (nm) | 634.6 |
| | T750-1000 average internal transmittance (%) | 0.7 |

TABLE 5-continued

| Type | Phosphoric acid |
|---|---|
| T1000-1200 maximum internal transmittance (%) | 4.1 |
| T450 internal transmittance/(T1000-1200 maximum internal transmittance) | 23.4 |

As described above, it is understood that the near infrared ray absorbing glass used has high transmittance in a visible light region and is excellent in light shielding property in a near infrared ray region.

Examples 1-1 to 1-5: Spectral Characteristics of Resin Film

Each of the pigments of the compounds 1 to 6 was mixed with a polyimide resin solution prepared in the same manner as in calculation of the spectral characteristics of the above-mentioned compound at a concentration shown in the following table, and stirred and dissolved at 50° C., for 2 hours to obtain a coating solution. Each of the obtained coating solution was applied to an alkaline glass (D263 glass, manufactured by SCHOTT, thickness: 0.2 mm) by a spin coating method to form a resin film having a film thickness of 3.0 μm.

With respect to each of the obtained resin films, a spectral transmittance curve in a wavelength range of 350 nm to 1,200 nm was measured using the ultraviolet-visible spectrophotometer.

Based on the obtained data of the spectral characteristics, the following were calculated: an average internal transmittance $T_{450\text{-}600AVE}$ and a maximum internal transmittance $T_{450\text{-}600MAX}$ at a wavelength of 450 nm to 600 nm, an internal transmittance $T_{450}$ at a wavelength of 450 nm, a difference between a shortest wavelength $IR50_{(S)}$ and a longest wavelength $IR50_{(L)}$ in the spectral transmittance curve at a wavelength of 650 nm to 900 nm at which the internal transmittance is 50%, an average internal transmittance $T_{700\text{-}800AVE}$ and a minimum internal transmittance $T_{700\text{-}800MIN}$ at a wavelength of 700 nm to 800 nm, a wavelength UV50 at which the internal transmittance is 50%, and an average internal transmittance $T_{370\text{-}400AVE}$ and a maximum internal transmittance $T_{370\text{-}400MAX}$ at a wavelength of 370 nm to 400 nm.

Results are shown in the following table. The spectral characteristics shown in the following table were evaluated in terms of internal transmittance in order to avoid an influence of reflection at an air interface and a glass interface.

Figure 5:
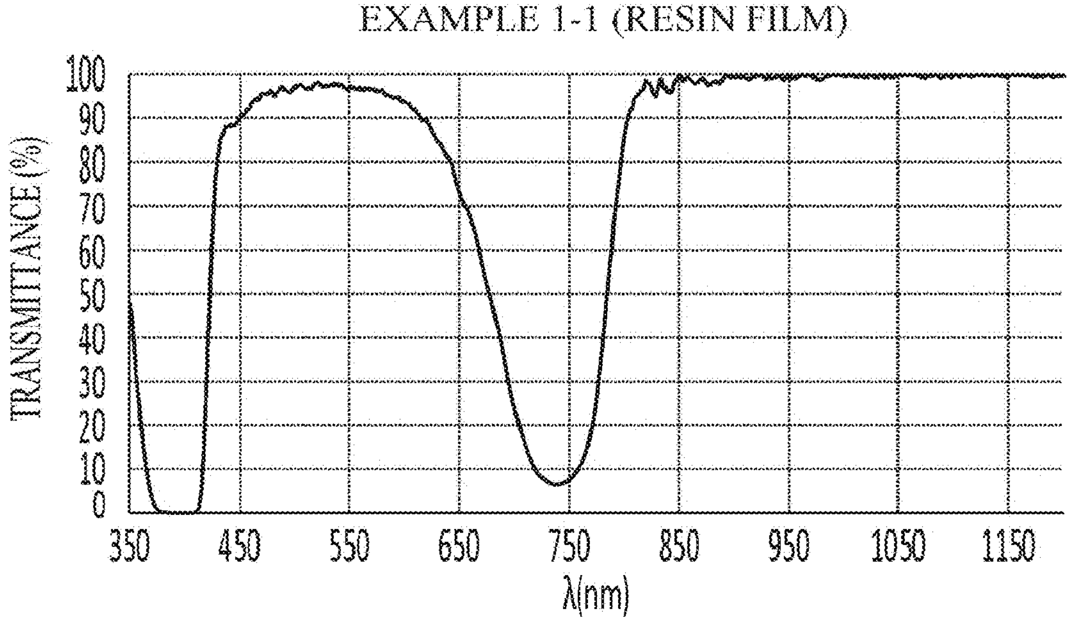
FIG. 5 is a diagram illustrating a spectral transmittance curve of a resin film of Example 1-1.

In addition, a spectral transmittance curve of the resin film of Example 1-1 is illustrated in FIG. 5.

Examples 1-1 to 1-5 are reference examples.

TABLE 6

| | | Example 1-1 | Example 1-2 | Example 1-3 | Example 1-4 | Example 1-5 |
|---|---|---|---|---|---|---|
| Added amount of pigment (mass %) | Compound 1 (λMAX: 722 nm) | 0.8 | 0.8 | 0.8 | 1.3 | 1.8 |
| | Compound 2 (λMAX: 400 nm) | 7.7 | 3.1 | 7.7 | 7.7 | 7.7 |
| | Compound 3 (λMAX: 752 nm) | 1.0 | 1.0 | 0.0 | 0.0 | 0.0 |
| | Compound 4 (λMAX: 773 nm) | 0.0 | 0.0 | 2.5 | 0.0 | 0.0 |
| | Compound 5 (λMAX: 845 nm) | 0.0 | 0.0 | 0.0 | 1.4 | 0.0 |
| | Compound 6 (λMAX: 1,112 nm) | 0.0 | 0.0 | 0.0 | 0.0 | 2.9 |
| | Total | 9.4 | 4.9 | 10.9 | 10.4 | 12.3 |
| Spectral characteristics of resin film | T450-600 average internal transmittance (%) | 95.9 | 96.9 | 94.5 | 92.5 | 91.5 |
| | T450-600 maximum internal transmittance (%) | 98.1 | 98.6 | 97.9 | 96.0 | 93.6 |
| | T450 internal transmittance (%) | 90.1 | 91.0 | 89.1 | 85.4 | 84.3 |
| | IR50(L) (nm) | 785 | 785 | 808 | 882 | 756 |
| | IR50(S) (nm) | 677.9 | 678.3 | 667.5 | 672.8 | 670.4 |
| | IR50(L) − IR50(S) (nm) | 107.1 | 106.7 | 140.5 | 209.2 | 85.6 |
| | T700-800 minimum internal transmittance (%) | 6.5 | 6.6 | 7.6 | 6.5 | 4.0 |
| | T700-800 average internal transmittance (%) | 22.8 | 23.0 | 11.5 | 21.0 | 40.0 |
| | UV50 (nm) | 423.4 | 419.6 | 419.2 | 424.2 | 424.8 |
| | T370-400 average internal transmittance (%) | 0.7 | 7.9 | 0.7 | 0.7 | 0.5 |
| | T370-400 maximum internal transmittance (%) | 4.0 | 25.6 | 3.9 | 3.9 | 3.2 |

Examples 2-1 to 2-5: Spectral Characteristics of Substrate

Each of the pigments of the compounds 1 to 6 was mixed with a polyimide resin solution prepared in the same manner as in calculation of the spectral characteristics of the above-mentioned compound at a concentration shown in the following table, and stirred and dissolved at 50° C., for 2 hours to obtain a coating solution. The obtained coating solution was applied to a near infrared ray absorbing glass (SP50T, manufactured by AGC) having a thickness of 0.28 nm by a spin coating method to form resin films having a film thickness of 3.0 μm.

With respect to each of the obtained resin films, a spectral transmittance curve in a wavelength range of 350 nm to 1,200 nm was measured using the ultraviolet-visible spectrophotometer.

Based on the obtained data of the spectral characteristics, the following were calculated: an average internal transmittance $T_{450\text{-}600AVE}$ and a maximum internal transmittance $T_{450\text{-}600MAX}$ at a wavelength of 450 nm to 600 nm, an internal transmittance $T_{450}$ at a wavelength of 450 nm, a wavelength IR50 at which the internal transmittance is 50%, an average internal transmittance $T_{750-1000AVE}$ and a maximum internal transmittance $T_{750-1000MAX}$ at a wavelength of 750 nm to 1,000 nm, a maximum internal transmittance $T_{1000-1200MAX}$ at a wavelength of 1,000 nm to 1,200 nm, the internal transmittance $T_{450}$/the maximum internal transmittance $T_{1000-1200MAX}$, a wavelength UV50 at which the internal transmittance is 50%, and an average internal transmittance $T_{370-400AVE}$ at a wavelength of 370 nm to 400 nm.

Results are shown in the following table. The spectral characteristics shown in the following table were evaluated in terms of internal transmittance in order to avoid an influence of reflection at an air interface and a glass interface.

Figure 6:
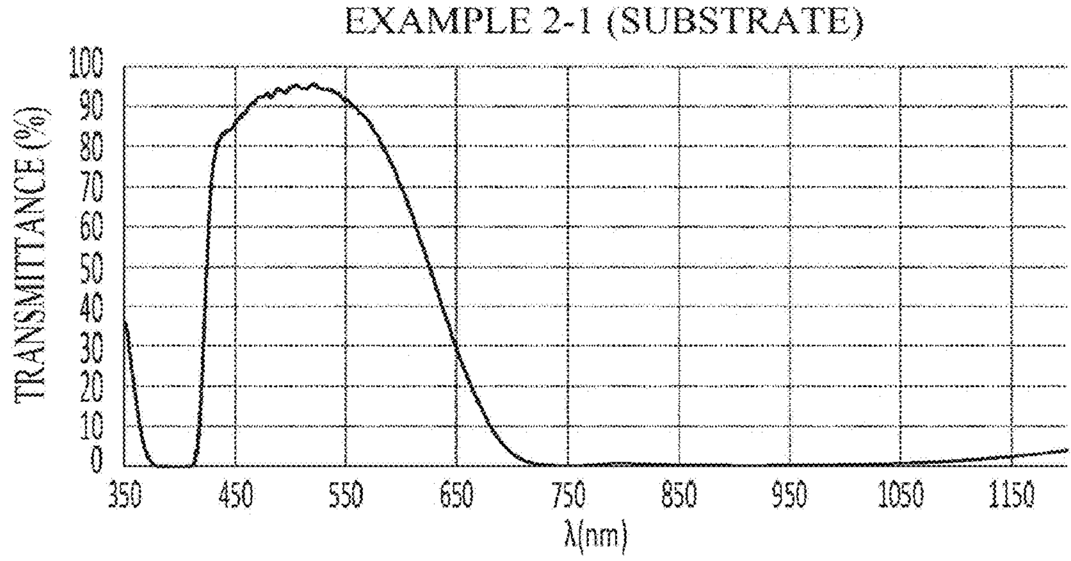
FIG. 6 is a diagram illustrating a spectral transmittance curve of a substrate of Example 2-1.

In addition, a spectral transmittance curve of the substrate of Example 2-1 is illustrated in FIG. 6.

Examples 2-1 to 2-5 are reference examples.

TABLE 7

| | | | Example 2-1 | Example 2-2 | Example 2-3 | Example 2-4 | Example 2-5 |
|---|---|---|---|---|---|---|---|
| Configuration of substrate | | Near infrared ray absorbing glass | Phosphate glass | Phosphate glass | Phosphate glass | Phosphate glass | Phosphate glass |
| | Content of pigment in resin film (mass %) | Compound 1 (λMAX: 722 nm) | 0.8 | 0.8 | 0.8 | 1.3 | 1.8 |
| | | Compound 2 (AMAX: 400 nm) | 7.7 | 3.1 | 7.7 | 7.7 | 7.7 |
| | | Compound 3 (λMAX: 752 nm) | 1.0 | 1.0 | 0.0 | 0.0 | 0.0 |
| | | Compound 4 (λMAX: 773 nm) | 0.0 | 0.0 | 2.5 | 0.0 | 0.0 |
| | | Compound 5 (λMAX: 845 nm) | 0.0 | 0.0 | 0.0 | 1.4 | 0.0 |
| | | Compound 6 (λMAX: 1,112 nm) | 0.0 | 0.0 | 0.0 | 0.0 | 2.9 |
| | | Total | 9.4 | 4.9 | 10.9 | 10.4 | 12.3 |
| | | Thickness of resin film (μm) | 3.0 | 3.0 | 3.0 | 3.0 | 3.0 |
| Spectral characteristics of substrate | | T450-600 average internal transmittance (%) | 90 | 90 | 88 | 86 | 85 |
| | | T450-600 maximum internal transmittance (%) | 95.6 | 96.0 | 95.3 | 92.7 | 91.0 |
| | | Internal transmittance T450 (%) | 86.0 | 86.7 | 85.0 | 81.4 | 77.9 |
| | | IR50 (nm) | 625.6 | 625.7 | 619.6 | 623.3 | 619.7 |
| | | T750-1000 average internal transmittance (%) | 0.4 | 0.4 | 0.3 | 0.3 | 0.5 |
| | | T750-1000 maximum internal transmittance (%) | 0.85 | 0.85 | 0.53 | 0.83 | 1.48 |
| | | T1000-1200 maximum internal transmittance (%) | 4.1 | 4.0 | 4.0 | 4.1 | 2.2 |
| | | Internal transmittance T450/T1000-1200 maximum internal transmittance | 21.2 | 21.5 | 21.1 | 20.1 | 36.0 |
| | | UV50 (nm) | 423.9 | 419.4 | 424.4 | 424.9 | 426.1 |
| | | T370-400 average internal transmittance (%) | 0.5 | 6.1 | 0.4 | 0.4 | 0.3 |
| | | T370-400 maximum internal transmittance (%) | 3.45 | 21.69 | 3.30 | 3.29 | 2.61 |

From the above-mentioned results, it is understood that by combining a glass excellent in near infrared ray absorption ability and visible light transmittance with a pigment which is deeply absorbed in the vicinity of 700 nm to 800 nm and has high visible light transmittance, the spectral characteristics of the optical filter can be substantially ensured only by absorption characteristics of the substrate. In particular, since the substrate of the present invention has a high ratio of visible light transmittance to near infrared light transmittance ($T_{450}/T_{1000-1200MAX}$), both visible light transmittance and near infrared shielding property are achieved.

Examples 3-1 to 3-4: Spectral Characteristics of Dielectric Multilayer Film

Two materials of a high refractive index material, a medium refractive index material, and a low refractive index material shown in the following table were alternately laid on or above a surface of an alkaline glass (D263 glass, manufactured by SCHOTT, thickness: 0.2 mm) by deposition to form dielectric multilayer films having a thickness shown in the following table.

With respect to each of the obtained dielectric multilayer film, spectral transmittance curves at an incident angle of 0 degrees and an incident angle of 50 degrees in a wavelength range of 350 nm to 1,200 nm were measured using the ultraviolet-visible spectrophotometer.

Based on the obtained data of the spectral characteristics, the following were calculated: a minimum transmittance $T_{450-600(0deg)MIN}$ at an incident angle of 0 degrees and a minimum transmittance $T_{450-600(50deg)MIN}$ at an incident angle of 50 degrees at a wavelength of 450 nm to 600 nm, a difference between the minimum transmittance $T_{450-600(0deg)MIN}$ and the minimum transmittance $T_{450-600(50deg)MIN}$, an average transmittance $T_{450-600(0deg)AVE}$ at an incident angle of 0 degrees and an average transmittance $T_{450-600(50deg)AVE}$ at an incident angle of 50 degrees at the wavelength of 450 nm to 600 nm, a difference between the average transmittance $T_{450-600(0deg)AVE}$ and the average transmittance $T_{450-600(50deg)AVE}$, and an average transmittance $T_{700-1200(0deg)AVE}$ at an incident angle of 0 degrees and an average transmittance $T_{700-1200(50deg)AVE}$ at an incident angle of 50 degrees at a wavelength of 700 nm to 1,200 nm.

Results are shown in the following table.

Examples 3-1 to 3-4 are reference examples.

TABLE 8

| | | Example 3-1 | Example 3-2 | Example 3-3 | Example 3-4 |
|---|---|---|---|---|---|
| Dielectric multilayer film | Low refractive index material (1.4 to 1.5) | $SiO_2$ | $SiO_2$ | $SiO_2$ | $SiO_2$ |
| | Medium refractive index material (1.6 to 2.1) | — | $ZrO_2$ + $Al_2O_3$ | Alumina lanthania | — |
| | High refractive index material (2.2 to 2.6) | $TiO_2$ | — | — | $TiO_2$ |
| | Number of layers of low refractive index material (1.4 to 1.5) | 30 | 20 | 20 | 21 |
| | Number of layers of medium refractive index material (1.6 to 2.1) | 0 | 20 | 20 | 21 |
| | Number of layers of high refractive index material (2.2 to 2.6) | 30 | 0 | 0 | 0 |
| | Thickness of low refractive index material (1.4 to 1.5) (nm) | 2,147 | 3,114 | 2,977 | 2,952 |
| | Thickness of medium refractive index material (1.6 to 2.1) (nm) | 0 | 280 | 2,451 | 0 |
| | Thickness of high refractive index material (2.2 to 2.6) (nm) | 708 | 0 | 0 | 1,920 |
| | Total thickness (nm) | 2,855 | 3,394 | 5,428 | 4,872 |
| | Total number of layers | 60 | 40 | 40 | 42 |
| Spectral characteristics of dielectric multilayer film | T450-600 minimum transmittance (0 deg) (%) | 94.4 | 93.7 | 94.4 | 94.1 |
| | T450-600 minimum transmittance (50 deg) (%) | 92.6 | 90.7 | 91.8 | 66.2 |
| | T450-600 minimum transmittance (0 deg to 50 deg) (%) | 1.8 | 3.0 | 2.6 | 27.8 |
| | T450-600 average transmittance (0 deg) (%) | 95.1 | 94.3 | 95.0 | 95.0 |
| | T 450 to 600 average transmittance (50 deg) (%) | 92.9 | 91.5 | 92.4 | 84.5 |
| | T450-600 average transmittance (0 deg to 50 deg) (%) | 2.2 | 2.8 | 2.6 | 10.5 |
| | T700-1200 average transmittance (0 deg) (%) | 53.7 | 68.9 | 57.8 | 3.8 |
| | T700-1200 average transmittance (50 deg) (%) | 52.8 | 69.9 | 61.3 | 12.7 |

From the above-mentioned results, it is understood that the multilayer film has high transmittance in the range of 450 nm to 600 nm at incident angles of 0 degrees and 50 degrees and the transmittance hardly changes, that is, the multilayer film has high transmittance in the visible light region and a ripple is hardly generated. In addition, it is understood from the transmittance in 700 nm to 1,200 nm that the near infrared light region is gently shielded.

Examples 4-1 to 4-9: Spectral Characteristics of Optical Filter

With respect to an optical film including the substrate having any of configurations of Examples 2-1 to 2-5 and the dielectric multilayer film (reflective film) having any of configurations of Examples 3-1 to 3-4, spectral transmittance curves at an incident angle of 0 degrees and an incident angle of 50 degrees in a wavelength range of 350 nm to 1,200 nm were measured using the ultraviolet-visible spectrophotometer.

A configuration of the optical filter was resin film/near infrared ray absorbing glass/reflective film.

Based on the obtained data of the spectral characteristics, the following were calculated: an average transmittance $T_{450\text{-}600(0deg)AVE}$ at an incident angle of 0 degrees and an average transmittance $T_{450\text{-}600(50deg)AVE}$ at an incident angle of 50 degrees at a wavelength of 450 nm to 600 nm, a difference between the average transmittance $T_{450\text{-}600(0deg)AVE}$ and the average transmittance $T_{450\text{-}600(50deg)AVE}$, a transmittance $T_{450(0deg)}$ at an incident angle of 0 degrees and a transmittance $T_{450(50deg)}$ at an incident angle of 50 degrees at a wavelength of 450 nm, a maximum transmittance $T_{450\text{-}600(0deg)MAX}$ at an incident angle of 0 degrees at a wavelength of 450 nm to 600 nm, a wavelength $IR50_{(0deg)}$ at which the transmittance is 50% at an incident angle of 0 degrees, a wavelength $IR50_{(50deg)}$ at which the transmittance is 50% at an incident angle of 50 degrees, an absolute value of a difference between the wavelength $IR50_{(0deg)}$ and the wavelength $IR50_{(50deg)}$, a maximum transmittance $T_{1000\text{-}1200(0deg)MAX}$ at an incident angle of 0 degrees and a maximum transmittance $T_{1000\text{-}1200(50deg)MAX}$ at an incident angle of 50 degrees at a wavelength of 1,000 nm to 1,200 nm, the transmittance $T_{450(0deg)}$/the maximum transmittance $T_{1000\text{-}1200(0deg)MAX}$, the transmittance $T_{450(50deg)}$/the maximum transmittance $T_{1000\text{-}1200(50deg)MAX}$, a wavelength $UV50_{(0deg)}$ at which the transmittance is 50% at an incident angle of 0 degrees, a wavelength $UV50_{(50deg)}$ at which the transmittance is 50% at an incident angle of 50 degrees, an absolute value of a difference between the wavelength $UV50_{(0deg)}$ and the wavelength $UV50_{(50deg)}$, an average transmittance $T_{370\text{-}400(0deg)AVE}$ at an incident angle of 0 degrees and an average transmittance $T_{370\text{-}400(50deg)AVE}$ at an incident angle of 50 degrees at a wavelength of 370 nm to 400 nm, a maximum transmittance $T_{750\text{-}1000(0deg)MAX}$ at an incident angle of 0 degrees and a maximum transmittance $T_{750\text{-}1000(50deg)MAX}$ at an incident angle of 50 degrees at a wavelength of 750 nm to 1,000 nm, and a maximum transmittance $T_{370\text{-}400(0deg)MAX}$ at an incident angle of 0 degrees and a maximum transmittance $T_{370\text{-}400(50deg)MAX}$ at an incident angle of 50 degrees at a wavelength of 370 nm to 400 nm.

Results are shown in the following table.

Figure 7:
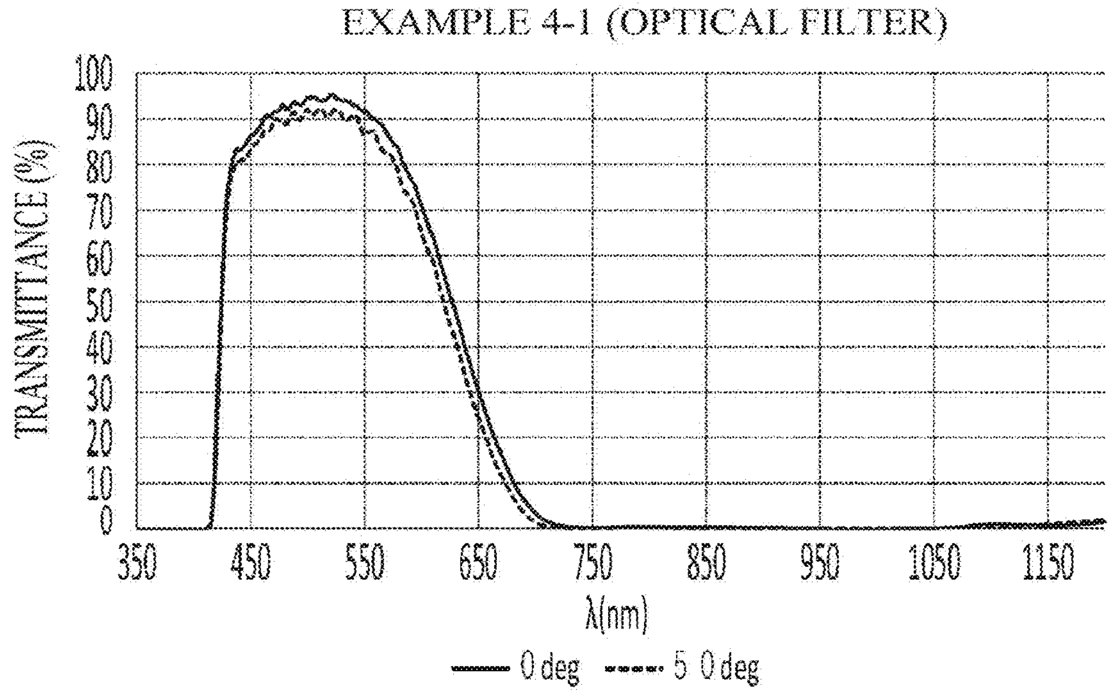
FIG. 7 is a diagram illustrating spectral transmittance curves of an optical filter of Example 4-1.

In addition, spectral transmittance curves of the optical filter of Example 4-1 is illustrated in FIG. 7.

Examples 4-1 to 4-3, 4-5, 4-6, and 4-9 are inventive examples, and Examples 4-4, 4-7, and 4-8 are comparative examples.

TABLE 9

| | | Example 4-1 | | Example 4-2 | | Example 4-3 | | Example 4-4 | |
|---|---|---|---|---|---|---|---|---|---|
| Configuration of optical filter | Substrate | Example 2-1 | | Example 2-1 | | Example 2-1 | | Example 2-1 | |
| | Dielectric multilayer film | Example 3-1 | | Example 3-2 | | Example 3-3 | | Example 3-4 | |
| Spectral characteristics of optical filter | | 0 deg | 50 deg | 0 deg | 50 deg | 0 deg | 50 deg | 0 deg | 50 deg |
| | T450-600 average transmittance (%) | 89.6 | 86.1 | 88.8 | 84.6 | 89.5 | 85.5 | 89.1 | 77.1 |
| | T450-600 average transmittance (0 deg to 50 deg) (%) | 3.50 | | 4.23 | | 4.04 | | 12.00 | |
| | T450 transmittance (%) | 86.2 | 83.6 | 86.3 | 81.6 | 86.1 | 82.6 | 81.2 | 66.0 |
| | T450-600 maximum transmittance (%) | 95.4 | 92.2 | 94.5 | 91.0 | 95.7 | 91.6 | 95.5 | 90.8 |
| | IR50 (nm) | 627.1 | 619.4 | 626.2 | 617.5 | 626.9 | 619.0 | 621.0 | 612.2 |
| | IR50 (0 deg to 50 deg) (nm) | 7.7 | | 8.8 | | 7.9 | | 8.8 | |
| | T1000-1200 maximum transmittance (%) | 1.4 | 2.0 | 2.2 | 1.9 | 2.6 | 2.1 | 0.4 | 1.5 |
| | T450 transmittance/(T1000-1200 maximum transmittance) (0 deg) (%) | 59.8 | | 38.4 | | 33.1 | | 228.6 | |
| | T450 transmittance/(T1000-1200 maximum transmittance) (50 deg) (%) | 42.6 | | 42.1 | | 38.9 | | 45.2 | |
| | UV50 (nm) | 424.0 | 424.6 | 424.0 | 424.8 | 424.0 | 424.8 | 419.0 | 420.3 |
| | UV50 (0 deg to 50 deg) (nm) | 0.6 | | 0.7 | | 0.8 | | 1.3 | |
| | T370-400 average transmittance (%) | 0.0 | 0.0 | 0.2 | 0.2 | 0.2 | 0.2 | 0.0 | 3.7 |
| | T370-400 maximum transmittance (%) | 0.0 | 0.0 | 1.3 | 1.7 | 1.2 | 1.6 | 0.5 | 7.1 |
| | T700-1000 average transmittance (%) | 0.4 | 0.1 | 0.4 | 0.2 | 0.3 | 0.1 | 0.0 | 0.0 |
| | T750-1000 maximum transmittance %) | 1.4 | 2.0 | 2.2 | 1.9 | 2.6 | 2.1 | 0.4 | 1.5 |

| | | Example 4-5 | | Example 4-6 | | Example 4-7 | |
|---|---|---|---|---|---|---|---|
| Configuration of optical filter | Substrate | Example 2-2 | | Example 2-3 | | Example 2-4 | |
| | Dielectric multilayer film | Example 3-1 | | Example 3-1 | | Example 3-1 | |
| Spectral characteristics of optical filter | | 0 deg | 50 deg | 0 deg | 50 deg | 0 deg | 50 deg |
| | T450-600 average transmittance (%) | 90.5 | 87.1 | 88.4 | 84.8 | 86.7 | 82.9 |
| | T450-600 average transmittance (0 deg to 50 deg) (%) | 3.40 | | 3.60 | | 3.79 | |
| | T450 transmittance (%) | 87.2 | 84.5 | 85.6 | 82.5 | 82.3 | 79.0 |
| | T450-600 maximum transmittance (%) | 95.8 | 93.2 | 95.1 | 92.2 | 92.8 | 89.3 |
| | IR50 (nm) | 627.9 | 620.8 | 621.4 | 614.3 | 625.1 | 616.8 |
| | IR50 (0 deg to 50 deg) (nm) | 7.0 | | 7.1 | | 8.3 | |
| | T1000-1200 maximum transmittance (%) | 1.4 | 1.9 | 1.3 | 1.8 | 1.4 | 1.9 |
| | T450 transmittance/(T1000-1200 maximum transmittance) (0 deg) (%) | 61.9 | | 64.8 | | 57.1 | |
| | T450 transmittance/(T1000-1200 maximum transmittance) (50 deg) (%) | 43.5 | | 45.0 | | 40.6 | |
| | UV50 (nm) | 420.0 | 420.6 | 424.3 | 425.1 | 424.9 | 425.6 |
| | UV50 (0 deg to 50 deg) (nm) | 0.6 | | 0.7 | | 0.7 | |
| | T370-400 average transmittance (%) | 0.0 | 0.4 | 0.0 | 0.0 | 0.0 | 0.0 |
| | T370-400 maximum transmittance (%) | 0.000 | 0.708 | 0.0000 | 0.0100 | 0.0000 | 0.0100 |
| | T700-1000 average transmittance (%) | 0.4 | 0.1 | 0.3 | 0.1 | 0.3 | 0.1 |
| | T750-1000 maximum transmittance (%) | 1.4 | 1.9 | 1.3 | 1.8 | 1.4 | 1.9 |

| | | Example 4-8 | | Example 4-9 | |
|---|---|---|---|---|---|
| Configuration of optical filter | Substrate | Example 2-5 | | Example 2-2 | |
| | Dielectric multilayer film | Example 3-1 | | Example 3-2 | |
| Spectral characteristics of optical filter | | 0 deg | 50 deg | 0 deg | 50 deg |
| | T450-600 average transmittance (%) | 86.3 | 82.5 | 89.7 | 85.5 |
| | T450-600 average transmittance (0 deg to 50 deg) (%) | 3.80 | | 4.14 | |
| | T450 transmittance (%) | 82.8 | 79.7 | 87.2 | 82.5 |
| | T450-600 maximum transmittance (%) | 91.5 | 88.7 | 95.0 | 91.8 |
| | IR50 (nm) | 626.4 | 619.1 | 627.0 | 618.9 |
| | IR50 (0 deg to 50 deg) (nm) | 7.2 | | 8.1 | |
| | T1000-1200 maximum transmittance (%) | 0.7 | 0.9 | 2.2 | 1.9 |
| | T450 transmittance/(T1000-1200 maximum transmittance) (0 deg) (%) | 113.8 | | 39.7 | |

TABLE 9-continued

| | | | | |
|---|---|---|---|---|
| T450 transmittance/(T1000-1200 maximum transmittance) (50 deg) (%) | 85.2 | | 43.0 | |
| UV50 (nm) | 425.0 | 425.8 | 420.0 | 420.6 |
| UV50 (0 deg to 50 deg) (nm) | 0.7 | | 0.6 | |
| T370-400 average transmittance (%) | 0.0 | 0.0 | 2.6 | 3.7 |
| T370-400 maximum transmittance (%) | 0.0000 | 0.0080 | 8.0 | 13.3 |
| T700-1000 average transmittance (%) | 0.5 | 0.2 | 0.4 | 0.2 |
| T750-1000 maximum transmittance (%) | 1.7 | 0.9 | 2.2 | 1.9 |

From the above-mentioned results, it is understood that the optical filters of Examples 4-1 to 4-3, 4-5, 4-6, and 4-9 are less likely to generate ripples in the visible light region even at a high incident angle, and are excellent in transmittance in the visible light region and light shielding property in the near infrared region of 700 nm to 1,200 nm.

In the optical filter of Example 4-4, the difference between the average transmittance $T_{450\text{-}600(0deg)AVE}$ and the average transmittance $T_{450\text{-}600(50deg)AVE}$ is large, and a change in visible light transmittance is large at a high incident angle. In Example 4-4, the transmittance $T_{450(50deg)}$ at the wavelength of 450 nm and the average transmittance $T_{450\text{-}600(50deg)AVE}$ at the wavelength of 450 nm to 600 nm at an incident angle of 50 degrees are also low. It is considered that the dielectric multilayer film used in Example 4-4 is excellent in light shielding property in the near infrared region, but is likely to generate ripples in the visible light region at a high incident angle.

It is understood that in the optical filters of Examples 4-7 and 4-8, the transmittance $T_{450(50deg)}$ at an incident angle of 50 degrees at the wavelength of 450 nm is low. In addition, the maximum transmittance $T_{450\text{-}600(0deg)MAX}$ at an incident angle of 0 degrees at the wavelength of 450 nm to 600 nm is also low. In Examples 4-7 and 4-8, a maximum absorption wavelength of a pigment compound used in combination with the compound 1 having a maximum absorption wavelength of 722 nm was 845 nm (compound 5 was used) in Example 4-7 and 1,112 nm (compound 6 was used) in Example 4-8. In general, the longer the maximum absorption wavelength is, the lower the transmittance in the visible light region tends to be, and thus it is considered that in Examples 4-7 and 4-8, the transmittance in the visible light region was reduced.

Although the present invention has been described in detail with reference to specific embodiments, it is apparent to those skilled in the art that various changes and modifications can be made without departing from the spirit and scope of the present invention. The present application is based on a Japanese patent application (No. 2021-113057) filed on Jul. 7, 2021, and the contents thereof are incorporated herein by reference.

INDUSTRIAL APPLICABILITY

The optical filter according to the present invention has spectral characteristics of excellent transmittance of visible light, small change in transmittance in a visible light region even at a high incident angle, and excellent shielding property in a near infrared light region. The optical filter is useful for applications of imaging devices such as cameras and sensors for transport machines, for which high performance has been achieved in recent years.

REFERENCE SIGNS LIST

1A, 1B, and 1C: optical filter
10: substrate
11: near infrared ray absorbing glass
12, 12A, and 12B: resin film
20, 20A, and 20B: dielectric multilayer film

What is claimed is:

1. An optical filter, comprising:

a substrate, a dielectric multilayer film 1 laid on or above one major surface of the substrate, and a dielectric multilayer film 2 laid on or above the other major surface of the substrate, wherein the substrate comprises a near infrared ray absorbing glass and a resin film, the resin film has a thickness of 10 μm or less, the resin film comprises a resin and a pigment (NIR1), and the optical filter satisfies all of the following spectral characteristics (i-1) to (i-3), and (i-6) to (i-8):

(i-1) in a spectral transmittance curve at an incident angle of 0 degrees, an average transmittance $T_{450\text{-}600(0deg)AVE}$ at a wavelength of 450 nm to 600 nm is 80% or more, (i-2) in a spectral transmittance curve at an incident angle of 50 degrees, an average transmittance $T_{450\text{-}600(50deg)AVE}$ at the wavelength of 450 nm to 600 nm is 80% or more, (i-3) an absolute value of a difference between the average transmittance $T_{450\text{-}600(0deg)AVE}$ and the average transmittance $T_{450\text{-}600(50deg)AVE}$ is 5% or less, (i-6) in the spectral transmittance curve at an incident angle of 0 degrees, a maximum transmittance $T_{450\text{-}600(0deg)MAX}$ at the wavelength of 450 nm to 600 nm is 90% or more, (i-7) in the spectral transmittance curve at an incident angle of 0 degrees, a wavelength $IR50_{(0deg)}$ at which a transmittance is 50% is in a range of 610 nm to 650 nm, and (i-8) in the spectral transmittance curve at an incident angle of 50 degrees, a wavelength $IR50_{(50deg)}$ at which a transmittance is 50% is in the range of 610 nm to 650 nm, and the optical filter satisfies the following spectral characteristics:

in the spectral transmittance curve at an incident angle of 0 degrees, a maximum transmittance at a wavelength of 750 nm to 1000 nm is 2.6% or less, and in the spectral transmittance curve at an incident angle of 50 degrees, a maximum transmittance at a wavelength of 750 nm to 1000 nm is 3% or less.

2. The optical filter according to claim 1, further satisfying the following spectral characteristic:

in the spectral transmittance curve at an incident angle of 0 degrees, the maximum transmittance $T_{450\text{-}600(0deg)MAX}$ at the wavelength of 450 nm to 600 nm is 93% or more.

3. The optical filter according to claim 1, further satisfying the following spectral characteristic:

in the spectral transmittance curve at an incident angle of 50 degrees, the maximum transmittance at a wavelength of 750 nm to 1000 nm is 2.1% or less.

4. The optical filter according to claim 1, further satisfying the following spectral characteristics (i-4) and (i-5):

(i-4) in the spectral transmittance curve at an incident angle of 0 degrees, a transmittance $T_{450(0deg)}$ at a wavelength of 450 nm is 80% or more, and (i-5) in the spectral transmittance curve at an incident angle of 50 degrees, a transmittance $T_{450(50deg)}$ at the wavelength of 450 nm is 80% or more.

5. The optical filter according to claim 1, further satisfying the following spectral characteristic:

in the spectral transmittance curve at an incident angle of 0 degrees, a transmittance $T_{450(0deg)}$ at a wavelength of 450 nm is 85% or more.

6. The optical filter according to claim 1, further satisfying the following spectral characteristics (i-19) and (i-20):

(i-19) in the spectral transmittance curve at an incident angle of 0 degrees, an average transmittance $T_{370\text{-}400(0deg)AVE}$ at a wavelength of 370 nm to 400 nm is 2% or less, and (i-20) in the spectral transmittance curve at an incident angle of 50 degrees, an average transmittance $T_{370\text{-}400(50deg)AVE}$ at a wavelength of 370 nm to 400 nm is 2% or less.

7. The optical filter according to claim 1, further satisfying the following spectral characteristic:

in the spectral transmittance curve at an incident angle of 0 degrees, an average transmittance at a wavelength of 750 nm to 1000 nm is 0.4% or less.

8. The optical filter according to claim 1, further satisfying the following spectral characteristic:

in the spectral transmittance curve at an incident angle of 50 degrees, an average transmittance at a wavelength of 750 nm to 1000 nm is 0.2% or less.

9. The optical filter according to claim 1, wherein the near infrared ray absorbing glass satisfies all of the following spectral characteristics (iii-1) and (iii-2):

(iii-1) an average internal transmittance $T_{450\text{-}600AVE}$ at the wavelength of 450 nm to 600 nm is 90% or more, and (iii-2) an internal transmittance $T_{450}$ at the wavelength of 450 nm is 92% or more.

10. The optical filter according to claim 1, wherein the near infrared ray absorbing glass satisfies all of the following spectral characteristics (iii-3) and (iii-4):

(iii-3) a wavelength IR50 at which an internal transmittance is 50% is in a range of 625 nm to 650 nm, and (iii-4) an average internal transmittance $T_{750\text{-}1000AVE}$ at a wavelength of 750 nm to 1,000 nm is 2.5% or less.

11. The optical filter according to claim 1, wherein the near infrared ray absorbing glass satisfies all of the following spectral characteristics (iii-5) and (iii-6):

(iii-5) a maximum internal transmittance $T_{1000\text{-}1200MAX}$ at the wavelength of 1,000 nm to 1,200 nm is 5% or less, and (iii-6) the internal transmittance $T_{450}$/the maximum internal transmittance $T_{1000\text{-}1200MAX} \geq 10$.

12. The optical filter according to claim 1, wherein the resin film satisfies all of the following spectral characteristics (iv-1) to (iv-3):

(iv-1) an average internal transmittance $T_{450\text{-}600AVE}$ at the wavelength of 450 nm to 600 nm is 93% or more, (iv-2) a maximum internal transmittance $T_{450\text{-}600MAX}$ at the wavelength of 450 nm to 600 nm is 95% or more, and (iv-3) an internal transmittance $T_{450}$ at the wavelength of 450 nm is 86% or more.

13. The optical filter according to claim 1, wherein the resin film satisfies all of the following spectral characteristics (iv-4) and (iv-5):

(iv-4) $IR50_{(L)}-IR50_{(S)} \geq 90$ nm where $IR50_{(S)}$ is a shortest wavelength and $IR50_{(L)}$ is a longest wavelength at which an internal transmittance is 50% in a spectral transmittance curve at a wavelength of 650 nm to 900 nm, and (iv-5) a minimum internal transmittance $T_{700\text{-}800MIN}$ at a wavelength of 700 nm to 800 nm is 10% or less.

14. The optical filter according to claim 1, wherein the resin film comprises a squarylium compound as the pigment (NIR1), and the resin film further comprises at least one of a squarylium compound and a cyanine compound as a pigment (NIR2) having a maximum absorption wavelength in the resin longer than the maximum absorption wavelength of the pigment (NIR1) in the resin by 20 nm to 60 nm.

15. The optical filter according to claim 1, wherein the resin film is provided by one layer or two layers.

16. An imaging device comprising the optical filter according to claim 1.

* * * * *